United States Patent
Bloomquist et al.

(10) Patent No.: US 10,949,778 B2
(45) Date of Patent: *Mar. 16, 2021

(54) COMPUTER-IMPLEMENTED SYSTEMS AND METHODS OF ANALYZING DATA IN AN AD-HOC NETWORK FOR PREDICTIVE DECISION-MAKING

(71) Applicant: TransVoyant, Inc., Alexandria, VA (US)

(72) Inventors: Kirk Elliot Bloomquist, Shorewood, MN (US); Dennis William Groseclose, Great Falls, VA (US)

(73) Assignee: Transvoyant, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,761

(22) Filed: Sep. 11, 2018

(65) Prior Publication Data

US 2019/0028534 A1 Jan. 24, 2019

Related U.S. Application Data

(63) Continuation of application No. 14/279,526, filed on May 16, 2014, now Pat. No. 10,091,276, which is a (Continued)

(51) Int. Cl.
*H04L 29/08* (2006.01)
*G06F 9/50* (2006.01)
(Continued)

(52) U.S. Cl.
CPC ............. *G06Q 10/06* (2013.01); *G06Q 10/10* (2013.01); *G08B 31/00* (2013.01);
(Continued)

(58) Field of Classification Search
CPC ...... G06F 9/5072; G06F 19/366; G06Q 10/00
See application file for complete search history.

(56) References Cited

U.S. PATENT DOCUMENTS 4,872,122 A 10/1989 Altschuler et al.
7,231,114 B2 6/2007 Jenkins et al.
(Continued)

OTHER PUBLICATIONS

International Searching Authority, International Search Report for International Application PCT/US14/57670 dated Feb. 18, 2015, 1 pg.

(Continued)

*Primary Examiner* — Nicholas R Taylor
*Assistant Examiner* — Sanjoy Roy
(74) *Attorney, Agent, or Firm* — Duane Morris LLP

(57) ABSTRACT

A computer-implemented system and method of predictive decision-making in an ad hoc network. The computer-implemented method includes receiving a set of rules into the ad hoc network and identifying a data set for each rule. The computer-implemented method also includes selecting a first and second node from the ad hoc network to process a first and second rule as a function of the identified data set according to an optimizing algorithm. The computer-implemented method also selects a third node to receive the processed results from the first and second nodes. An indication is provided of the processed results by the third node.

20 Claims, 18 Drawing Sheets

Related U.S. Application Data continuation-in-part of application No. 14/039,771, filed on Sep. 27, 2013, now Pat. No. 9,424,521.

(51) Int. Cl.
| | |
|---|---|
| *G08B 31/00* | (2006.01) |
| *G06Q 10/06* | (2012.01) |
| *G06Q 10/10* | (2012.01) |
| *G06N 5/02* | (2006.01) |
| *H04W 4/02* | (2018.01) |
| *H04W 84/18* | (2009.01) |
| *H04W 4/029* | (2018.01) |

(52) U.S. Cl.
CPC ......... *H04L 67/2828* (2013.01); *H04W 4/029* (2018.02); *G06N 5/025* (2013.01); *H04W 84/18* (2013.01)

(56) References Cited

U.S. PATENT DOCUMENTS

| | | | |
|---|---|---|---|
| 7,477,815 B2 | 1/2009 | Jenkins et al. | |
| 8,332,344 B2 | 12/2012 | Kato | |
| 8,359,223 B2 | 1/2013 | Chi et al. | |
| 8,364,519 B1 | 1/2013 | Basu et al. | |
| 8,490,869 B2 | 7/2013 | Brown | |
| 8,738,425 B1 | 5/2014 | Basu et al. | |
| 8,841,859 B2 | 9/2014 | Chemel et al. | |
| 9,031,889 B1 | 5/2015 | Basu et al. | |
| 9,230,211 B1 | 1/2016 | Basu et al. | |
| 2005/0222811 A1 | 10/2005 | Jakobson et al. | |
| 2006/0173857 A1* | 8/2006 | Jackson | G06F 9/5072 |
| 2006/0184527 A1 | 8/2006 | Chi et al. | |
| 2006/0271563 A1 | 11/2006 | Angelo et al. | |
| 2007/0087756 A1 | 4/2007 | Hoffberg | |
| 2007/0195712 A1 | 8/2007 | Thayer et al. | |
| 2010/0057660 A1* | 3/2010 | Kato | G06F 11/008 |
| | | | 706/47 |
| 2010/0223211 A1* | 9/2010 | Johnson | G06Q 10/00 |
| | | | 706/11 |
| 2011/0071964 A1* | 3/2011 | Horvitz | G08G 1/0104 |
| | | | 706/12 |
| 2011/0295628 A1 | 12/2011 | Priyadarshan et al. | |
| 2012/0101974 A1* | 4/2012 | Duan | G06N 7/005 |
| | | | 706/52 |
| 2012/0131139 A1 | 5/2012 | Siripurapu et al. | |
| 2012/0233315 A1 | 9/2012 | Hoffman et al. | |
| 2012/0271949 A1 | 10/2012 | Radhakrishnan et al. | |
| 2012/0296699 A1 | 11/2012 | Adams | |
| 2012/0296899 A1* | 11/2012 | Adams | G16H 10/40 |
| | | | 707/736 |
| 2013/0191523 A1 | 7/2013 | Buck et al. | |

OTHER PUBLICATIONS

International Searching Authority, International Preliminary Report on Patentability for PCT/US14/57670 dated Mar. 29, 2016, 8pgs.

Bouha, N., "Modeling, Multi Agent Approach and Tools for Decision Support Systems Applied Urban Road Traffic," ISKO-Maghreb, IEEE Conference Publications, 3rd International Symposium 2013, 7pgs.

Geffre, J., et al., "Strategic Threat Probabilities with Hierarchical Spatiotemporal Predictions," IEEE Intelligent Systems Computer Society, IEEE Journals and Magazines, vol. 30, Issue 6, Nov./Dec. 2015, pp. 72-80.

Drachen, A., et al., "Spatial Game Analytics and -Visualization," Computational Intelligence in Games (CIG), IEEE Conference Publications, 2013, 8pgs.

Cheng, J., "Temporal Deontic Relevant Logic as the Logical Basis for Decision Making Based on Anticipatory Reasoning," 2006 IEEE International Conference on Systems, Man, and Cybernetics, vol. 2, Oct. 8-11, 2006, pp. 1036-1041.

International Searching Authority, International Search Report for International Application PCT/US15/28282 dated Aug. 4, 2015, 1 pg.

European Patent Office, Extended European Search Report for corresponding EP Application No. 14847371.3 dated May 15, 2017, 8pgs.

European Patent Office, Extended European Search Report for corresponding EP Application No. 15810275.6 dated Sep. 26, 2017, 7pgs.

* cited by examiner

COMPUTER-IMPLEMENTED SYSTEMS AND METHODS OF ANALYZING DATA IN AN AD-HOC NETWORK FOR PREDICTIVE DECISION-MAKING

CROSS-REFERENCE TO RELATED APPLICATIONS

This application is a continuation application of and claims priority to U.S. patent application Ser. No. 14/279,526, filed May 16, 2014, the entirety of which is herein incorporated by reference, and which is a continuation-in-part application of and claims priority to U.S. patent application Ser. No. 14/039,771, filed on Sep. 27, 2013 now U.S. Pat. No. 9,424,521, issued Aug. 23, 2016, the entirety of which is herein incorporated by reference.

FIELD

The present disclosure is directed generally to analyzing data and more particularly to computer implemented systems and methods of analyzing data in an ad-hoc network for predictive decision-making.

DESCRIPTION OF THE RELATED ART

Having access to information has become increasingly important in today's society. Over the past ten years, government and business entities have invested in their respective capability to collect and analyze large amounts of data including intelligence, risk, supply chain, transaction, location and behavioral data. Government agencies have seen the need to compress cycle time in their intelligence, targeting and risk management decision processes to combat rapidly changing national security risks, threats and tactics. Commercial entities have also, and similarly, seen the need for a compressed decision cycle time to address the rapid increase in the speed at which the global consumers' preferences and desires (consumer demand) must be met.

Some conventional models of handling these rapidly changing environments, risks, and threats emphasize having as much data as possible and rely on huge buffer stocks of data inventory in order to protect against change. However, such conventional models have been largely unsuccessful because the end result is a large quantity of unmanageable information without an effective solution for analyzing, processing and providing such information to drive real-time predictive decision-making against such rapidly changing risks, threats and environments.

Mobile devices such as cellular phones, Personal Digital Assistants (PDAs), tablets, other wirelessly enabled devices, and remote sensing technology have successfully penetrated and been adopted by the general consumer market and by many government entities. Individuals, businesses and government agencies have come to enjoy, appreciate and rely on the convenience, flexibility and mobility of wireless devices and sensors as a means to readily obtain access to information, facilitate communications and interact with friends, family, colleagues and business entities, other friendly deployed units, etc. Thus, it is critical that systems and methods for delivering information to information users place the information at the fingertips of the users in order to permit enhanced real-time predictive decision-making.

Conventional systems and methods for retrieving and delivering information such as search engine platforms (e.g. Google, Bing) store static information (e.g. information about web pages on the World Wide Web) in databases for use in later queries by users of the search engine platforms. For example, various conventional search engine platforms store static information for all or part of a cached source page as well as various pieces of static information about the web pages (e.g. words extracted from the title, parts of the text contained in the web page, meta tags, etc.) in databases. Conventional search engine providers collect this static information related to web pages using web crawlers and other data mining techniques. The search engine provider analyzes the static information to determine the manner of storing the information with a goal of permitting retrieval of information related to a user's query as quickly as possible.

When a user enters a query into a conventional search engine platform (typically by using keywords), the search engine platform queries its store of static information and provides a result set often consisting of a listing of best-matching web pages according to its criteria for storing, usually with a short summary including the title of the web page and sometimes parts of the text of the web page. Various conventional search engines (e.g. Google, Lexis-Nexis) permit users to query their databases by date, key words, and support the use of the Boolean operators (e.g. AND, OR and NOT), and/or proximity operators, to further specify the search query. Other conventional search engine platforms (e.g. ask.com) are designed for natural language queries which allow the user to type a question in the same form one would ask it to a human to retrieve relevant stored information.

Various search engine platforms employ methods to rank the results to provide the "best" or most relevant results first. Techniques for determining what web pages are the best matches for a user's query, and what order the results should be shown in, include leveraging ranking algorithms, pre-programmed, predefined and hierarchically ordered keywords, and "inverted" storage techniques that analyze information located during a query-based search. Such search engine platforms provide users with static information results based on query-based searching techniques. Such conventional platforms are based on retrieving static information based on user queries, and providing such information to the user so that the user may review the provided information and/or ask further questions to obtain a desired answer. Thus, such conventional platforms are limited by the specificity of the user queries, the relatedness of the user's query to the desired result, and the user's own cycle time for reviewing the provided information.

Other conventional systems for collecting and processing information and providing results to users include systems that monitor and collect information from various sources, including data streaming from sensors, static emitters and other intelligence sources (e.g. human intelligence (HU-MINT), signals intelligence (SIGINT), electronic intelligence (ELINT), full motion video (FMV), etc.) and provide analytical, desktop-based software tools to analysts or other individuals (e.g. forward deployed soldiers or agents) that retrieve the streaming data from the network, store the data, process the data temporally from storage, and re-assemble the data for evaluation by the human user. Evaluation of the data and correlating data elements across the various data sources is conventionally accomplished manually using individual requests for information (RFIs) conducted in real-time (e.g. via chat or other communication means). Such systems are time-intensive, laborious, require manual analysis and correlation, are subject to human error and slow down analysis of the data and decision-making based on such analysis. Such conventional techniques are subject to perishable correlations since the correlations are manually performed. Moreover, such methods and systems are reactive to what has happened in the past rather than what is happening in the present or what is about to happen in the future.

Other conventional systems for collecting and processing information and providing results to users include systems that monitor and collect information from various sources, including data streaming from sensors and static emitters, store the data, and analyze such data using spatiotemporal rule-based engines, repositories of spatial and temporal boundaries, and repositories of rules. In such conventional rule-based systems, users may define spatial and temporal boundaries that represent areas of interest as well as rules that define conditions such as inside, outside, enter, exit, and distance relative to such spatial and temporal boundaries. In such conventional systems, all of the data streaming from sensors and static emitters is collected and stored in persistent storage and each rule is applied by querying all of the collected and stored data. When a rule tests "true" (e.g. two objects come within a defined proximity of a defined area of interest) an "event" is generated by the rule-based engine and a user can be alerted of the generation of such event. For example, in such conventional systems, spatial queries are applied to the collected and stored data either automatically (e.g. based on Cartesian coordinates) or manually (e.g. via an operator running spatial queries) and an alert is generated if data enters or exits the spatially defined area. However, these conventional systems cannot process or analyze contextual elements of data and thus generate many spurious events and require human analysts to analyze the contextual elements of the objects and/or the generated event. None of the collected and stored data is disregarded which results in a high number of required operations and system latency. Spatial and temporal elements of the streaming data and static emitter data are not operated on in a distributed environment which prevents the dynamic generation of events necessary for predictive decision-making. Additionally, changes or modifications to existing rules, or the creation of new rules in these conventional systems require changes to the system infrastructure or software code and do not provide any capability to permit users to change rules on the fly based on spatial and temporal and/or contextual results received either manually or automatically. What is needed are systems and methods for dynamically predicting events, analyzing risks, and taking decisive predictive actions based on efficiently receiving and processing information having spatial and temporal, and/or contextual elements in a multidimensional environment, in the correct context and at the correct time and place.

Like the accelerated adoption of the Internet itself, cloud computing is rapidly gaining momentum. Cloud computing refers to a computing model for enabling on-demand network access to a shared pool of configurable information technology (IT) capabilities or resources (e.g., networks, servers, storage, applications, and services) that can be rapidly provisioned and released, e.g., with minimal management effort or service provider interaction. Cloud computing allows users to access technology-based services from a network cloud without knowledge of, expertise with, or control over the technology infrastructure that supports them, much as consumers of electric utilities are agnostic as to details of the underlying electrical grid. The cloud is a service provider's offering of abstracted computing-related services. The cloud computing model generally enables on-demand computing self-service, ubiquitous network access, location independent resource pooling, rapid elasticity (e.g., quick demand-based resource scaling), and measured computing service.

Cloud computing models permit service providers to offer services on an on-demand or as-needed (e.g. subscription basis) and customers to purchase (or rent) computer infrastructure-related services as an outsourced service (e.g., on an as-needed or as-consumed basis) instead of having to purchase equipment (e.g., servers, software, data center space, or network equipment) themselves.

SUMMARY

In some embodiments of the present disclosure, a computer-implemented method for predictive decision-making is provided. The computer-implemented method includes receiving a first set of rules and receiving first data including spatial, temporal and contextual elements. The computer-implemented method also includes identifying each rule of the first set for which the received first data is a candidate. For the identified rules for which the received first data is a candidate, the first received data is indexed in memory (e.g. Random Access Memory (RAM)) by its temporal, spatial or contextual elements as a function of the identified rules. The computer-implemented method also includes receiving second data including spatial, temporal and contextual elements and identifying each rule of the first set for which the received second data is a candidate. For the identified rules for which the received second data is a candidate, the received second data is indexed in memory by its temporal, spatial or contextual elements as a function of the identified rules. The computer-implemented method further includes identifying an event as satisfying an identified rule in memory using the indexed first and second data.

In some embodiments of the present disclosure, a computer-implemented method for predictive decision-making is provided. The computer-implemented method includes receiving a request for a new rule defining a relationship between spatial, temporal and contextual elements. The computer-implemented method also includes identifying an existing rule having a defined relationship between spatial, temporal and contextual elements and recommending a modification to said new rule request based on the identified existing rule.

In some embodiments of the present disclosure, a computer-implemented method for predictive decision-making is provided. The computer-implemented method includes receiving a first set of rules. The computer-implemented method also includes receiving first data and second data including respective spatial, temporal and contextual elements, identifying each respective rule of the first set for which the received first data or received second data is a respective candidate, and indexing the respective received first data or received second data in memory as a function of the identified rules. The computer-implemented method includes evaluating the indexed received first and second data in memory to determine whether an identified rule is satisfied.

In some embodiments of the present disclosure, a computer-implemented method for predictive decision-making is provided. The computer-implemented method includes receiving a first set of rules, receiving a plurality of data including spatial, temporal and contextual elements for a predetermined period of time, identifying each rule of the first set for which the received plurality of data is a candidate, and storing the plurality of data that is identified as being a candidate for one or more rules of the first set in persistent storage. The computer-implemented method also includes retrieving the stored plurality of data and indexing the retrieved data in memory by its temporal, spatial or contextual elements as a function of the identified rules for which the retrieved data is a candidate. The computer-implemented method further includes identifying an event as satisfying one or more rules of the first set of rules using the indexed retrieved data.

In some embodiments of the present disclosure, a computer-implemented method for predictive decision-making is provided. The computer-implemented method includes evaluating indexed data in memory to identify an event as satisfying a rule of a first set of rules and providing a rule suggestion based on the identified event. The computer-implemented method also includes modifying a rule of a set of rules based on the rule suggestion. The computer-implemented method further includes receiving data including spatial, temporal and contextual elements, identifying received data as being a candidate for one or more rules of the set of rules including the modified rule, and indexing the identified data by its spatial, temporal or contextual elements as a function of the one or more rules.

In some embodiments of the present disclosure, a system for predictive decision-making is provided. The system includes a plurality of predictive service cores configured to provide processing, distributed working memory, and a plurality of distributed nodes in a network in a cloud of a cloud computing environment, a user interface module configured to provide a plurality of portals and a plurality of service catalogs for respective users of the cloud, a rules manager configured to receive a first set of rules for a respective user and define a respective distributed data structure for determining whether data is a candidate for each respective rule of the first set of rules, and one or more data modules configured to receive first data comprising spatial, temporal and contextual elements. The system also includes a rules/decision engine module configured to identify each rule of the first set for which the received data is a candidate, index the received data in memory by its spatial, temporal and contextual elements as a function of the identified rules, and identify events as satisfying identified rules in memory using the indexed data. The distributed working memory of the system includes a plurality of in-memory distributed data structures to place the indexed data.

In some embodiments of the present disclosure, a computer-implemented method for predictive decision-making is provided. The computer-implemented method includes receiving a set of rules into an ad-hoc network having distributed nodes, where each node is capable of processing the set of rules. The computer-implemented method also includes identifying a data set for each received rule. The computer-implemented method also includes selecting a first node from the distributed nodes to process a received first rule as a function of the identified data set; selecting a second node from the distributed nodes to process a received second rule as a function of the identified data set; and, selecting a third node from the distributed nodes to receive the processed results from the first and second node as a function of the received set of rules. The computer-implemented method also includes receiving the processed results from the first and second nodes at the third node and providing an indication of the received processed results at the third node.

In some embodiments of the present disclosure, a computer-implemented method for predictive decision-making is provided. The computer implemented method includes receiving a set of rules into an ad-hoc network having distributed nodes, where each node is capable of processing the set of rules. The computer implemented method also includes identifying a data set for each received rule. An optimizing algorithm is used to select two or more nodes from the distributed nodes to each process a respective received rule and to select a third node from the distributed nodes to receive the processed results from the two or more nodes. The computer implemented method also includes receiving the processed results from the two or more nodes at the third node, and providing a rule suggestion based on the received processed results.

In some embodiments of the present disclosure, a system for predictive decision-making is provided. The system includes a set of rules and a plurality of distributed nodes forming an ad hoc network, each of the plurality of nodes being capable of processing the set of rules and of receiving data from a data source. The plurality of nodes comprise a first node to process a first rule, a second node to process a second rule, and a third node to receive the processed results from the first and second nodes and provide an indication of the processed results. The system also includes a rules manager configured to identify a data set for each rule of the set of rules, to select the first and second nodes as a function of the identified data set for the first and second rules, and to select the third node as a function of the set of rules.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION OF THE EXAMPLES

Figure 1:
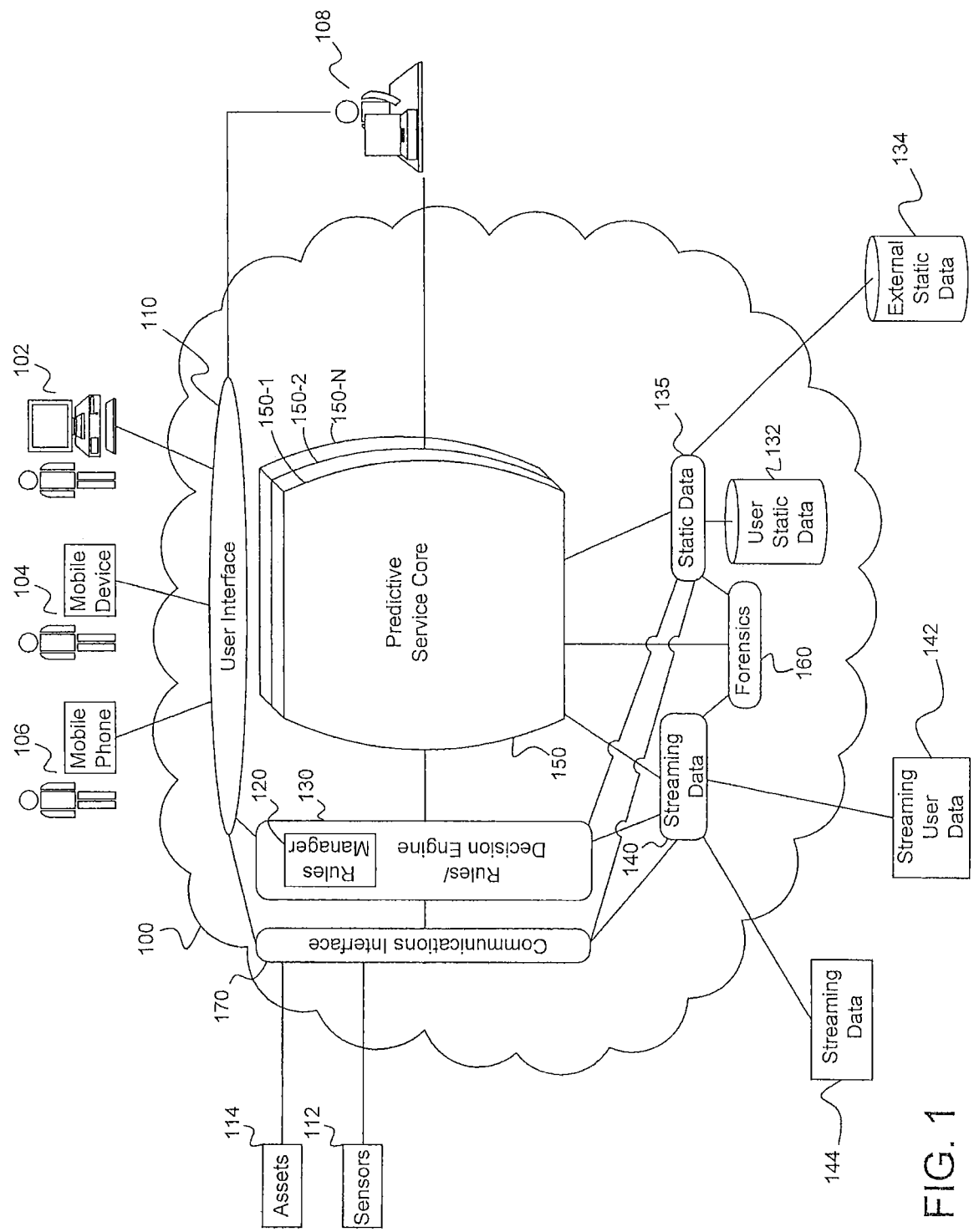
FIG. 1 is a block diagram of an example of a cloud management platform in accordance with some embodiments of the present disclosure.

With reference to the Figures, where like elements have been given like numerical designations to facilitate an understanding of the drawings, the various embodiments of a system and method of analyzing spatial, temporal and contextual elements of data for predictive decision-making are described. The figures are not drawn to scale.

Various embodiments address the foregoing deficiencies of prior art systems and methods of collecting and analyzing information and providing results to users and provide systems and methods to facilitate real-time spatial, temporal and contextual based decision-making and predictive analytics in dynamic and high data volume environments to the benefit of government, business and individual users, and providers of such services, alike. For example, users benefit from being able to define and modify complex rules without administrator support, system restart or software code revisions, to receive real-time results and notifications when such defined rules are satisfied by determined correlations between spatial, temporal and contextual elements of dynamic data, to analyze risks efficiently, and to enable predictive decision-making. Service providers also benefit from being able to collect and analyze high volumes of complex static data (e.g. data of roads, railroad tracks, points of interest, power lines, utility locations, facility/base locations, power grid locations, planted crop data, etc.) and dynamic data (e.g. streaming data of sensors or components providing location and other dynamically changing attribute data, human location data, seismic data, weather data, sea state data, avionics data, targets of interest data, plane location data, ship location data, cargo data, intelligence data, etc.) efficiently in memory, minimize storage requirements, and offer such services on an on-demand or as-needed basis over the Internet or Web and instead of requiring users to utilize and purchased individually based software.

The following description is provided as an enabling teaching of a representative set of examples. Many changes can be made to the embodiments described herein while still obtaining beneficial results. Some of the desired benefits discussed below can be obtained by selecting some of the features or steps discussed herein without utilizing other features or steps. Accordingly, many modifications and adaptations, as well as subsets of the features and steps described herein are possible and can even be desirable in certain circumstances. Thus, the following description is provided as illustrative and is not limiting.

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present disclosure. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that a system or apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. The term "adjacent" as used herein to describe the relationship between structures/components includes both direct contact between the respective structures/components referenced and the presence of other intervening structures/components between respective structures/components.

As used herein, use of a singular article such as "a," "an" and "the" is not intended to exclude pluralities of the article's object unless the context clearly and unambiguously dictates otherwise.

The inventors have developed a system and method of analyzing spatial, temporal and contextual elements of data that provide users with predictive decision-making capabilities to improve revenue, decrease costs, shorten detection to response cycle times, save lives, protect equipment, minimize impact of weather and natural disasters, efficiently use resources, exploit and/or take advantage of opportunities, avoid blackouts or brownouts, and permit individuals, businesses, government agencies, friends and families alike to proactively detect and predict potential problems or risks and provide tailored solutions before the onset of such problems or risks. For example, the inventors have determined that systems and methods provided herein can predict, prevent, alert and insure against catastrophic weather conditions (e.g. fire, tornadoes, hurricanes, flooding) based on real-time weather, upcoming public or private event data, scheduled routes (e.g. air, land or sea), sources of news and social media, and predicted patterns of causal factors. The inventors have further determined that systems and methods provided herein can actively alert, alter and re-route traffic (e.g. shipping traffic, air traffic, vehicular traffic), alert and alter schedules, alert, optimize and implement equipment, network, grid configurations, based on real-time weather, currents, emission rules, fuel optimization, and continuously updated hazard (e.g. piracy, protest, violent uprising) information, thereby protecting valuable and/or hazardous cargo (e.g. shipments) and increasing revenue.

The inventors have also determined that systems and methods provided herein can actively track, trace, monitor, manage and alert employees, contractors based on real-time weather, health, product or service demand, financial, etc. information, thereby optimizing workforce and increasing revenue. The inventors have observed, for example, that the systems and methods described herein can provide continuous risk analysis and real-time event prediction for units operating on patrol (e.g. from being ambushed by enemy soldiers) and automate efforts to significantly shorten a cycle time between risk identification and elimination. By way of example, the inventors have also observed that the systems and methods described herein can detect and predict real-time demand influences of individuals and groups and inject automated demand influencers, to increase revenue of businesses, apply user-defined preference and movement-pattern data and contextual data to optimize real-time movement and scheduling of social events and other human interactions, and analyze real-time information and provide alerts directed to satisfying emotional and social needs of individuals and groups alike. The inventors have further determined that, for example, the systems and methods described herein can provide continuous risk analysis, real-time event prediction and/or notification, real-time sequencing optimization, real-time geospatial (e.g. weather) tracking and alerting, remote device monitoring, crowd sourcing, etc. services for a wide variety of industries (e.g. electric power, oil and gas, industrial manufacturing, transportation, life sciences/ healthcare, agriculture/food and beverage, high tech, retail/ consumer, financial services) and automate efforts to significantly shorten cycle times between risk identification, mitigation and/or elimination.

For example, the inventors have observed that the systems and methods described herein can analyze real-time information and provide real-time alerts, recommendations and solutions, modeling, research, idea generation, and interactive decision-making for spill mitigation, plant safety, energy trading, crew management, security and protection, etc. to oil and gas industry users, remote monitoring and maintenance, manufacturing plant monitoring/control, vehicle and fleet monitoring/control, driverless vehicle, building energy usage management, demand response, supply chain risk, plant safety, security and facility protection, commodity price, spare parts demand, etc. to industrial manufacturing users, hedge funds, investment banks, private equities, venture capital, wealth management, commodity traders, mutual funds, pension funds, corporate investments, insurance investments etc. to financial industry users, utilities, independent power producers, retail, ancillary services, service and maintenance, equipment and systems, engineering and construction, finance developers, transmission system operators, regulators, etc. to electric power/utilities users, remote management, facility/campus management, logistics process management, labor management, risk management, etc. for high tech industry users (e.g. suppliers, contract manufacturers, OEMs, software, and retail users), and for grower segment (e.g. field monitoring, advanced farming techniques, logistics segment (energy/fuel consumption, routing/re-routing, maintenance, consumption) production and manufacturing (commodity purchasing), wholesale (commodity purchasing) for agriculture and other food and beverage industry users and retail/wholesale industry users.

Various embodiments of the present disclosure provide a cloud computing environment 100 as shown in FIG. 1 that includes multiple blocks of hardware, referred to as predictive service cores (denoted predictive service cores 150-1, 150-2, . . . , 150-N; these may be referred to collectively as "predictive service cores 150") and various modules operating in a cloud computing environment 100 including a user interface 110, a rules/decision engine module 130 including a rules manager 120, streaming data module 140, and static data module 135 that provide real-time, in-memory collection and analysis of dynamic and static data including spatial, temporal and contextual elements, and predictive decision outputs, based on complex rules established, defined and modified by users accessing the system via the user interface 110. In some embodiments, static data module receives user static data 132 (e.g. from one or more static data sources for one or more users or groups of users), and/or external static data 134 (e.g. from one or more static data sources external to users or groups of users). In some embodiments, streaming data module receives streaming user data 142 (e.g. from one or more streaming data sources for one or more users or groups of users), and/or external streaming data 144 (e.g. from one or more streaming data sources external to users or groups of users). Cloud computing environment 100 can also include forensics module 160 for recording, reporting, tuning and playback of collected data. Although three predictive service cores are shown in this example, any number of predictive service cores may be used. Operational personnel 108 (e.g., system administrators or other personnel of a service provider) may access the rules manager 120 of the rules/decision engine module 130 (referred to as rules/decision module 130 for convenience) and/or the user interface 110. In various embodiments, operational personnel 108 can access other modules (e.g. forensics module 160, streaming data module 140, static data module 135, etc.).

Figure 2:
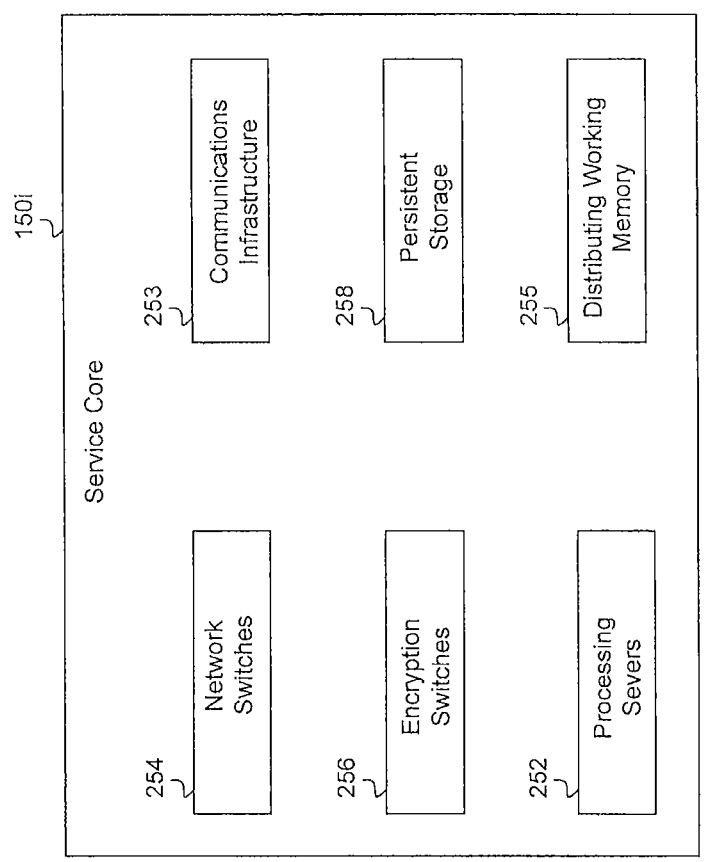
FIG. 2 is a diagram of an example of a service core for a cloud in a cloud computing environment in accordance with some embodiments.

FIG. 2 shows an example of a predictive service core 150-$i$ that includes one or more servers 252 (e.g., Linux, windows, blade servers), distributed working memory 255 (e.g. one or more in-memory data grids), and one or more network switches, including network switch 254 and/or encryption switch 256. In various embodiments, predictive service core 150-$i$ includes a persistent storage unit 258 (e.g. NoSQL database). In various embodiments, distributed working memory 255 is software running on server 252 and includes a plurality of in-memory data grids, server 252 is a blade server running the distributed working memory software and communicating with user interface module 110 via an object-oriented data interchange format such as JavaScript Object Notation (JSON) and providing NoSQL persistence. Distributed working memory 255 can provide scalability, distribution and/or resiliency to the architecture of predictive service core 150-$i$. In various embodiments, predictive service core 150-$i$ includes a plurality of distributed nodes built on top of distributed working memory 255 using distributed working memory software. In various embodiments, distributed working memory 255 includes a plurality of in-memory distributed data structures to place indexed received data.

Referring again to FIG. 1, the user interface module 110 provides an interface between users 102 and the cloud 100 (e.g. a public cloud). The user in this context may refer to a customer of the cloud (e.g. business employee, government agency employee, agent, analyst, soldier, etc.) provided by a predictive service provider or an individual at a customer site with a network connection to the cloud 100. In various embodiments, the user interface 110 is a representational state transfer (REST) application programming interface (API) based on a JSON model to provide access to many types of clients (e.g. thick and thin clients, mobile phone 106 clients, mobile device 104 clients, desktop 102 clients, etc.) In various embodiments, user interface module 110 provides a Web-based interface (e.g. via a web-based application). In various embodiments, user interface 110 provides platform/ device independent visualization. In various embodiments, user interface 110 provides portal services to many types of clients (106, 104, 102). In various embodiments, user interface module 110 includes web services. In various embodiments, user interface module 110 provides a command driven interface (e.g. DOS, Linux, etc. command driven interface).

The user interface module 110 can include a portal, including a separate portal and a particular dynamic service catalog for each customer (e.g., for each of several businesses, government agencies, units, or other organizations). A dynamic service catalog includes one or more static and/or dynamic data sources (e.g. structured data sources, unstructured data sources, sensors, collection systems, GPS, RFID, towers, HUMINT, SIGINT, ELINT, FMV, Automatic Identification System (AIS) inputs, temporary flight restrictions (TFR) inputs, mapping data sources, public transit (e.g. bus, rail, light rail, etc.) routes and schedules, traffic data sources, NASDAQ, NYSE, AMEX, social media sources, proprietary customer data sources, etc.), structured data indices of spatial, temporal and/or contextual elements, user-defined rules and/or sets of rules, user-defined alerts/notifications, user-defined forensics requirements, and/or automatic indicators of rule satisfaction. In various embodiments, a dynamic service catalog can be changed based on a user's input and/or an administrator's input (e.g. based on a user's subscription to a service of the cloud service provider). Users within one organization can be segregated from users in other organizations and users in one portion of an organization can be can be segregated from users in other portions of the same organization. Users working on one project for an organization can be can be segregated from users working on another project for the same organization. Although the breakdown is by organizations, portions of organizations, or projects within organizations, in these examples, portals may be used for providing access to users in other segregational or classification schemes. Users are referred to generically as users 102.

The rules manager 120 of rules/decision engine module 130 manages rule-based operations including without limitation the operations of creating rules, modifying rules, providing rule suggestions, providing rule modification suggestions, providing for data source association with rules, providing fields for a user's input of rule elements, and/or defining a plurality of distributed data structures in memory for determining whether data that is received into the system is a candidate for rules managed by rules manager 120. In various embodiments, the rules manager interfaces with user interface module 110, predictive service core 150, streaming data module 140, and static data module 135. As used herein, rules are user or system-defined scenarios, questions, or algorithms defining relationships of spatial, temporal and contextual data elements of interest to a user, groups of users, or other systems or machines. In various embodiments, rules include a plurality of rule fields. In various embodiments, rules are created manually (e.g. by a user or by groups of users) via, for example, user interface 110. In various embodiments, rules are generated automatically by rules manager 120 in communication with other managers and/or sub-modules of rules/decision engine module 130 based upon determined relationships, patterns, trends, forecasts and/or other forms of analysis executed by such sub-modules or managers (e.g. based upon a created relationship between one or more spatial, temporal or contextual elements of indexed data in memory). In various embodiments, rules are generated automatically by rules/decision engine module 130 in communication with one or more other modules (e.g. forensics module 160).

In various embodiments, a rule identifies relationships between potential candidates of a rule. As used herein, data is a candidate for a rule if the data is relevant to the rule such that it could be correlated with other data to satisfy the rule. A rule is satisfied if spatial, temporal and contextual data elements of indexed data distributed in memory, derived data and events, and/or received or retrieved data meet all of the definitions of required fields for the rule. In some embodiments, rules/decision module 130 can evaluate variables having spatial, temporal and contextual elements defined by a user via user interface module 110 and/or automatically defined by one or more modules in cloud computing environment 100, in combination with such data, to determine whether a rule is satisfied. In various embodiments, rules/decision engine module 130 identifies an event as satisfying a rule. In various embodiments, rules can be suggested by rules/decision engine module 130 based on satisfaction of other rules.

In various embodiments, rules manager 120 creates a distributed data structure (e.g. in a distributed data structure such as, for example, a distributed R-tree index, Quadtree index, Rete diagram, Gna tree, Octree, Grid, Z-order, time-split B-tree, multi-version B-tree, etc., architecture) in memory (e.g. in an in-memory data grid) for each rule, and/or for the rules managed by rules manager 120. In various embodiments, rules manager 120 stores rules created by or for a particular user 102 (104, 106) in a rules storage unit (e.g. NoSQL database) for the particular user 102 (104, 106). In some embodiments, rules manager 120 can store rules created by or for a particular user 102 (104, 106) in a non-transitory, tangible machine readable storage medium. The non-transitory, tangible storage medium can be a non-transitory computer readable storage medium. The computer readable medium can be a machine-readable storage device, a machine-readable storage medium, a memory device (e.g., flash or random access memory), a hard disk drive, a tape drive, an optical drive (such as, but not limited to CDROM, DVD, or BDROM) or the like, or a combination of one or more of them.

In some embodiments, rules manager 120 provides a rule creation interface via user interface 110 including various fields such as but not limited to rule name, spatial data elements, temporal data elements, contextual data elements, source inputs, satisfaction of notification requirements, to user 102 (104, 106) and a user selects and defines fields for each respective rule. For example, rule fields can include ship or aircraft identification, speed, origin, location, time, flag, seismic information, proximity information, relative time etc. In various embodiments, each rule associated with a user in rules manager 120 includes a respective field associated with each of a respective one of a spatial, temporal or contextual element.

The respective fields can include any suitable respective spatial, temporal or contextual element or combinations thereof. For example, one or more respective rule fields can include spatial elements such as geo-location information, proximity information, altitude information, density information, depth information, size information, shape information, geometry type information, relative entry or exit information, relative inside or outside information, cluster information, boundary information, predicted and actual tack information and combinations thereof, another one or more respective rule fields can include temporal elements such as absolute time information, relative time information, date information, time proximity information, date proximity information, time/date window information, automatically adjustable date/time window information, date/time window proximity information, schedule information, velocity information, acceleration information, and combinations thereof, and another one or more respective rule fields can include contextual elements such as attribute information, origin information, destination information, route information, passenger information, cargo information, vehicle information, airframe information, corporate information, fuel type information, signature information, temperature information, oceanographic information, weather parameter information, capability information, historical information, identification information, financial information, threat assessment information, intelligence information, emergency information, injury information, and combinations thereof.

Various rules can be created and/or modified in memory via rules manager 120. In one example, a rule defined by a user in rules manager 120 can be if an earthquake of greater than 5.1 on the Richter scale occurs within fifty miles of a particular car manufacturing facilities in Japan that represent more than 55% of the output for that particular car manufacturer and stock associated with the that particular car manufacturer is trading above $65, provide all rule-users (e.g. stock owners) with notification of the event. In another example, a rule defined by a user in rules manager 120 can be notify all rule-users, communicate a predetermined warning over bridge-to-bridge communications, and notify the Coast Guard station nearest the location where the rule is satisfied, thirty minutes before a fishing trawler crosses over a user's (e.g. a communications company) undersea fiber in water less than 100 feet deep, when winds are blowing over 30 knots, atmospheric pressure greater than or equal to 20 bar, or waves are in excess of 5 feet. Another rule example defined by a user can be to provide a parent rule-user with notification if their child is not within 0.5 miles of their house between 7 p.m. and 6 a.m. on weekdays or between 10 p.m. and 6 a.m. on weekends. Another rule example defined by a user can be to provide a parent rule-user with notification if a registered sex offender is within 1 mile of their child's bus route between 7 a.m. and 8 a.m., or between 4 p.m. and 6 p.m., on weekdays. In another example, a rule defined by a user in rules manager 120 can be if social media sources indicate a bomb has exploded near the White House, but real-time data says there are no traffic or public transit delays in Washington, D.C., automatically power on a police scanner and provide verification to a rule-user.

Another example of a rule according to various embodiments, can be to provide notification to all rule users (e.g. a transit company) if identified sensitive cargo traveling on a company's truck along an identified transit path is approaching a storm, a major traffic incident or social unrest after a loss by a sports team within 50 miles of the truck's current location. Another example could be to notify local authorities and deploy the closest intelligence assets (e.g. assets capable of collecting HUMINT, SIGINT, ELINT, imagery intelligence (ILINT), measurement and signature intelligence (MASINT), technical intelligence (TECHINT), open source intelligence (OSINT), FMV, etc.) to investigate social media uses of keywords (e.g. "bomb" or "attack" or "jihad") within 20 miles of identified cargo, tanker shipping or areas of interest. Another example could be to notify local and/or federal law enforcement authorities and deploy the closest intelligence assets (e.g. assets capable of collecting HUMINT, SIGINT, ELINT, imagery intelligence (ILINT), measurement and signature intelligence (MASINT), technical intelligence (TECHINT), open source intelligence (OSINT), FMV, etc.) to investigate social media uses of keywords (e.g. Twitter® identifiers with the letter "p" at the front or back, "escort", "service", etc.) within a predetermined timeframe (e.g. 6 p.m. to 6 a.m.) within 10 miles of identified location types (e.g. restaurants, truck stops, hotels, motels, etc.) and during events that have been previously associated with human trafficking, prostitution and other types of criminal activity (e.g. major sporting, major concert, etc.) Another example of a rule could be to provide tipping and queuing and deploy the closest intelligence assets (e.g. assets capable of collecting HUMINT, SIGINT, ELINT, imagery intelligence (ILINT), measurement and signature intelligence (MASINT), technical intelligence (TECHINT), open source intelligence (OSINT), FMV, etc.) if real-time streaming, blue force tracking data indicates that a convoy is within a specified proximity to a specified person or area of interest and the data is less than 1 hour old.

Another example of a rule defined by a user in rules manager 120 can be to provide a predetermined message to a patient of a dietician or doctor (e.g. "Keep up all of your hard work in staying healthy") if the patient is approaching within two blocks of a fast food restaurant running a special on a patient's favorite sandwich between 11 a.m. and 1 p.m. on weekdays. Another example can be to notify a user when real-time severe weather conditions and social media uses of keywords (e.g. water, river, injury, closed, warning, destroyed, hurt, etc.) occur in real-time within 100 meters of points of interest, routes (e.g. between home and work, doctor's office and at predetermined times of day. Another example of a rule could be to notify business managers and/or on-site crew managers or employees of real-time weather conditions (e.g. weather corridors, lightning strikes, etc.) within a predefined area (e.g. radius attribute), or number of severe weather events (e.g. 10 lightning strikes) within a predefined period of time (e.g. 1 minute) within a predefined area (e.g. radius attribute), and provide real-time asset status (e.g. trucks, ships, planes, work crews) and/or real-time tracking of damage to infrastructure or equipment. Another example could be a set of rules designed to provide real-time identification of trends and projection of gross domestic product for a country (e.g. country that is predominantly export driven such as Vietnam, etc.) for hedge fund manager users well in advance of official government statistics users based on real-time live streaming data of commercial vessel location and type (e.g. ship location, ship type (e.g. container, petroleum, chemical, etc.), aircraft location and aircraft type (e.g. global air cargo, etc.), etc.) and points of commercial interest (e.g. ports, harbors, airports such as Haiphong harbor, Saigon harbor, Vietnam International airport, etc.), rules to analyze and store such data for predefined periods of time (e.g. daily, weekly, monthly, etc.), rules to compute statistical parameters based on the stored data, rules to generate alerts when predefined commercial activity is reached, and/or rules to compare current observed real-time commercial flow against predefined moving averages automatically provided from stored data and/or generated alerts. Another example of a rule could be to provide early warning alerts to users (e.g. commercial business, postal companies, travelers) of likely air transit disruptions (e.g. Federal Aviation Administration issued ground stops, wildfires, volcanic ash, smoke, etc.) at specific airports and provides recommended alternate air routes if weather and/or seismic conditions within a defined proximity of scheduled airports and scheduled flights for cargo, mail, packages or persons (as appropriate), indicate likely grounding of aircraft to provide adequate time for users to re-route ground couriers to alternate airports, reschedule flights, or re-route transportation of users or employees to still ensure timely delivery and/or arrival.

Any suitable rule can be defined by users via user interface 110. In various embodiments, rules manager 120 provides a rule modification interface via user interface 110 to user 102 (104, 106) to modify the distributed data structure for the rule in memory. In some embodiments, rules manager 120 provides a rule modification interface via user interface 110 to user 102 (104, 106) to modify fields of an existing rule stored in a database of rules manager 120. In various embodiments, rules manager 120 creates a distributed data structure in memory (e.g. in an in-memory data grid) for each rule and/or in an in-memory database (e.g. IMDB, MMDB, memory resident database, etc.). In various embodiments, rules manager 120 creates one or more distributed data structure in memory for all of the rules managed by rules manager 120. In some embodiments, a distributed data structure for each rule, and/or for the rules managed by rules manager 120 is modified (e.g. automatically modified) in memory each time a field of a rule is modified and/or a rule is added into or deleted from the system. The inventors have determined that creating distributed data structures in an in-memory grid, for example, for the various rules managed by rules manager 120 vastly improves efficiency and scalability of the methods and systems described herein. In various embodiments, rules manager 120 stores rules in a NoSQL database. In various embodiments, rules manager 120, in communication with service core 150-$i$, can create a distributed data structure for each rule defined in rules manager 120 for user (i) in an in-memory data grid. In some embodiments, rules manager 120, in communication with service core 150-$i$, can store the rules for a particular user in a respective storage node (i) in NoSQL database 258 for a user (i) and partitioned by each rule defined in rules manager 120 for user (i). In various embodiments, rules manager 120, in communication with service core 150-$i$, can create a distributed data structure for all of the rules defined in rules manager 120 for a user, group of users, and/or all of the users of the system in an in-memory data grid.

Rules manager 120 can also synchronize data sources from streaming data module 140 and static data module 135 based on selected, defined rule fields for each respective rule. In various embodiments, a rule can be defined to include a date/time window field (e.g. a time window field based on latency of updating spatial elements of received data.) In various embodiments, rules manager 120 synchronizes feed timelines of data sources from streaming data module 140 to permit cross-monitoring of such sources and permit rules/decision engine module 130 to efficiently analyze multiple data sources. In various embodiments, rules manager 120 temporally synchronizes various data sources from streaming data module 140 and static data module 135 that are fed into cloud 100 in a manner that is not synchronized temporally. For example, streaming data module 140 receives streaming data from a source (e.g. ship location data) having an update latency of three hours and streaming data from a plurality of sources having an update latency of less than one minute (e.g. aircraft location data). In various embodiments, a moving time window can be created and configured automatically, and/or manually by an operator or user, for a rule for which the associated data is a candidate. For example, a moving time window can be created and configured using rules manager 120 for the ship location data source, using rules manager 120, such that a moving time window can be added to a temporal data structure (e.g. by adding a track to an index entry of a temporal distributed data structure) in distributed working memory for the ship location source for one or more rules for which the ship location data is identified as a candidate to cover the duration of the 3 hour latency period and until the moving time window expires at 3 hours. In various embodiments, rules/decision engine module 130 can identify events as having satisfied a rule using the moving date/time window. For example, a rule can require a ship to have a position within a defined proximity to a point of interest (e.g. oil rig, underwater obstruction, another ship, land mass, aircraft flying at an altitude of less than 10,000 feet, etc.) and the source of ship location data has a known latency of three hours. First data including ship location is received and rules/decision engine module 130 can evaluate whether a rule is satisfied using moving time window alone or in combination with second data that is received at the expiration of the latency period (e.g. after three hours). For example, rules/decision engine module 130 can use a moving time window to add a buffer zone track in a spatial index (e.g. spatial distributed data structure) based on the first received data (ship course, speed, etc.) and can identify an event as satisfying a rule using the buffer zone track. Further by way of example, rules/decision engine module 130 can use a moving time window to add a time window track in a temporal index (e.g. temporal distributed data structure) and can identify an event as having been satisfied during the latency period based on the first received data and second received data (ship location data received at separate event times three hours apart).

For example, a company may rely on the use of an undersea fiber such that outages of the fiber result in the most negative mission impact and unplanned costs of any problem that the company faces. Thus, the company is interested in knowing in advance of any likely cause of an outage of the undersea fiber to provide a mechanism for preventing the outage from occurring and/or to shift to alternate communication means (e.g. a non-collocated undersea fiber) in time to avoid significant disruption of their services. The company may know from past experience that the two most likely causes of cable outages are undersea seismic events and fishing trawling anchoring. The company may also understand that fishing trawlers only anchor when a storm is moving towards their vessel while underway and the winds are blowing in a specific direction and speed relative to their position, and that their chance of anchoring increases when they are moving below a speed indicating they are fishing and not in-transit. The systems and methods described herein provide a means to achieve such predictive decision-making by creating tailored rules, efficiently analyzing relevant real-time information in distributed working memory using those rules, and responding expeditiously and effectively.

The inventors have developed novel systems and methods to permit predictive-decision making by analyzing spatial, temporal and contextual elements of data using user-defined rules in rules manager 120 in distributed working memory. The inventors have determined that these novel systems and methods are critical to improving users' response and cycle time to real-time changes in the environment, national security risks, threats and tactics and to satisfy and meet global consumers' preferences and desires (consumer demand). The novel rules/decision engine module provides users with the capability to rapidly create and modify rules in memory that are based on real time events and real-time analytics, respond to particular problems and issues they face or expect to face, and manage risks, rapidly, efficiently and predictively. The inventors have also observed that providing such an environment permits service providers to analyze and collect high volumes of complex dynamic and static data efficiently in memory at significant benefit to their customers, minimize cost and overhead by significantly reducing storage requirements, and offer such services on an on-demand or as-needed basis over the Internet or Web to maximize revenue.

Streaming data module 140 includes real-time data (e.g. streaming data feeds) from intra-cloud and/or third party streaming data sources (e.g. weather sensors, seismic sensors, streaming data collection systems, GPS, RFID, towers, HUMINT, SIGINT, ELINT, FMV, AIS inputs, TFR inputs, air, rail, and/or vehicular traffic data sources, real-time market data sources, social media, proprietary customer streaming data sources, etc.) associated with a user (e.g.

based on an organization's subscription to the cloud 100 for the particular organization, portion of the organization, project, etc.). In various embodiments, streaming data module 140 provides flowing data streams of live data. Static data module 135 includes static data from intra-cloud and/or third party static data sources (e.g. data stored in memory in data structures and/or databases including mapping data sources, public transit (e.g. bus, rail, light rail, etc.) routes and schedules, proprietary customer static data sources, etc.) associated with a user (e.g. based on an organization's subscription to the cloud 100 for the particular organization, portion of the organization, project, etc.). In various embodiments, streaming data module 140 streams live data, and static data module 135 provides static data, into system 100 and is available to multiple users, and/or multiple service catalogs, to create rules in memory, modify rules in memory, make rule suggestions in memory, evaluate whether received data is a candidate for any existing rules in memory, evaluate whether existing rules are satisfied in memory, generate alerts in memory, collect for forensic analysis, etc.

The rules/decision engine module 130 manages real-time decision operations including, without limitation, the operations of analyzing received data from streaming data module 140 and static data module 135 in distributed working memory to identify rules from rules manager 120 for which the received data is a candidate, indexing received data by its spatial, temporal or contextual elements as a function of the identified rules (e.g. the rules that the received data is identified as being a candidate for satisfying), evaluating indexed data (e.g. data placed in distributed data structures in memory) to determine whether one or more rules are satisfied, disregarding data that is determined not to be a candidate for the rules associated with rules manager 120 for the user, a group of users, and/or all of the users of the system, identifying events as satisfying a rule using indexed data, indexing events by spatial, temporal or contextual elements, storing events in persistent storage, identifying rules as being satisfied using indexed data and/or events, creating relationships between one or more spatial, temporal or contextual elements of indexed data, suggesting relationships between one or more spatial, temporal or contextual elements of indexed data, placing the created relationships in distributed data structures in memory, and/or providing an indication that a rule is satisfied. In various embodiments, the rules/decision engine module 130 interfaces with user interface module 110, predictive service core 150-i, communication interface module 170, streaming data module 140, static data module 135, and/or forensics module 160.

In various embodiments, rules/decision engine module 130 analyzes received data from streaming data module 140 (e.g. individual or multiple live data streams) and/or static data module 135 to automatically identify and correct for anomalies in the received data (e.g. inbound data streams). In various embodiments, rules/decision engine module 130 identifies and corrects for anomalies in the received data prior to analyzing the data to determine if the received data is a candidate for any of such rules and prior to indexing such data. For example, rules/decision engine module 130 analyzes received data from multiple flowing data streams to identify whether data that should have an update latency of 10 seconds is not being updated for a longer period of time (e.g. 2 hours). Further by way of example, rules/decision engine module 130 analyzes received data from multiple flowing data streams to identify that data from streaming data source 1 has an update latency of 2 hours and data from streaming data source 2 has an update latency of 10 seconds.

In various embodiments, rules/decision engine module 130, in communication with rules manager 120, can automatically create and/or configure a spatial buffer zone of uncertainty entry for a track in a spatial index (e.g. spatial distributed data structure) to correct for an identified anomaly. For example, if rules/decision engine module 130 analyzes that an aircraft's three-dimensional location is updated every 3 minutes, the aircraft speed has varied between 450 and 560 miles per hour over the past 12 minutes, and the aircraft altitude and course have remained constant over the past 12 minutes, rules/decision engine module 130 can create a buffer zone of uncertainty for the aircraft (e.g. at the current course, altitude and speed) in a spatial, temporal, and/or contextual index (e.g. spatial, temporal and/or contextual distributed data structure of data identified as being a candidate of one or more rules manager by rules manager 120) during the latency period for use when identifying events as satisfying identified rules managed by rules manager 120. In various embodiments, rules/decision engine module 130, in communication with rules manager 120, can automatically create and/or configure a moving date/time window entry for a track in a temporal index to correct for an identified anomaly. In various embodiments, rules/decision engine module 130, in communication with rules manager 120 and streaming data module 140, can update spatial, temporal and contextual elements of received data in distributed data structures for defined rules using alternate streaming data sources (e.g. sensors, inertial navigation system, etc.) to correct for an anomaly. In various embodiments, rules/decision engine module 130, in communication with rules manager 120 and communication interface module 170, can provide a notification of an identified anomaly in received data. For example, rules/decision engine module 130, in communication with communications interface module 170, can provide an alert to a user and/or operator that an anomaly exists in the data received from a particular data source (e.g. not updating consistent with typical update latency). Other examples of anomalies include, but are not limited to, differences in dates/times when data is reported as being received as compared to actual dates/times (e.g. received from atomic time sources), frequency/latency that the data is updated as compared to known or learned latencies (e.g. aircraft location updated every 40 minutes when known latency is 1 minute, ship location updated every 12 hours when observed latency is every 3 hours, etc.), etc.

In various embodiments, rules/decision engine module 130 analyzes received data based on the fields defined for the rules associated with rules manager 120 to determine if the received data is a candidate for any of such rules, to optimize indexing operations and to minimize any persistent storage requirements. For example, rules/decision engine module 130 can analyze received data to identify and disregard spurious, or not relevant, data for any of the rules (and the respective fields associated with the rules) associated with rules manager 120 for one or more users. In various embodiments, rules/decision engine module 130 filters received data based on the fields defined for each rule of the rules associated with rules manager 120 and determines whether the received data is a candidate for any of such rules. In various embodiments, rules/decision engine module 130 analyzes received data based on distributed data structures created for the rules associated with rules manager 120 for one or more users, determines whether the received data is a candidate for any of such rules, and disregards data that is determined not to be a candidate for any of such rules.

In various embodiments, rules/decision engine module 130 disregards (e.g. does not place in distributed working memory) data that is determined not be a candidate for the rules associated with rules manager 120 for one or more users. For example, in some embodiments, rules/decision engine module 130 will not place into a distributed data structure in memory, and may expunge, all disregarded data from one or more users' respective predictive service core 150-N. In some embodiments, rules/decision engine module 130 can disregard data for a first user but can place the same data, or a subset of the same data, into distributed data structures in memory for a second user based on the second user's rules associated with rules manager 120. In some embodiments, rules/decision engine module 130 can disregard data for all users based on the rules associated with rules manager 120. In some embodiments, rules/decision engine module 130 can disregard data for a user but can still provide the data to forensics module 160 for the user. In various embodiments, if received data does not contain information responsive to any of the fields defined for rules associated with rules manager 120, rules/decision engine module 130 filters out and/or disregards the data. In various embodiments, rules/decision engine module 130 can create a distributed data structure for the rules associated with rules manager 120. For example, rules/decision engine module 130 can create a distributed data structure to identify data characteristics and/or data elements that are candidates for the rules associated with rules manager 120.

In various embodiments, for each identified rule for which the received data is identified as being a candidate, rules/decision engine module 130 indexes such data by its spatial, temporal and/or contextual elements identified as being a candidate for the rules associated with rules manager 120 as a function of the identified rules. As used herein, indexing means placing into a distributed data structure in memory. In some embodiments, rules/decision engine module 130 tags data during analyzing or indexing according to one or more fields of the rules. In various embodiments, rules/decision engine module 130 analyzes and indexes data automatically, dynamically, and without any user intervention or input. In various embodiments, rules/decision engine module 130 analyzes and indexes data automatically, dynamically, and without system interruption. In various embodiments, rules/decision engine module 130 indexes (e.g. places elements of received data in distributed data structures) received data in an in-memory (RAM) data grid (e.g. in a distributed data structure such as, for example, a distributed R-tree index, Quadtree index, Rete diagram, Gna tree, Octree, Grid, Z-order, time-split B-tree, multi-version B-tree, etc., data structure) according to the type of data element identified as being a candidate for the rule and as a function of the rule fields defined for the rules of a rule set for a user, group of users, etc.

In various embodiments, rules/decision engine module 130 places received data that is identified as a candidate for one or more rules of a set of rules managed by rules manager 120 in memory in distributed data structures as a function of the one or more rules. In various embodiments, rules/decision engine module 130 automatically and dynamically creates one or more spatial, temporal or contextual distributed data structures in memory for data based on the identified rules (and prior to reception of any data) and can automatically modify the created distributed data structures if the rules are modified. In various embodiments, rules/decision engine module 130 automatically places received data that is identified as a candidate for any rules of a set of rules in memory in one or more dimensional, distributed data structures as a function of the rules for which the received data is a candidate and based on the spatial, temporal or contextual elements of the received data by determining the priority of elements (e.g. priority of spatial, temporal or contextual elements) for the received data identified as being a candidate for the rules.

For example, received data that is identified as a candidate for rules of a set of rules may be indexed spatially, temporally or contextually as a function of the selected, defined fields of the rules managed by rules manager 120 which are based on user-defined priorities and/or based on the dimensional type of data element that is identified as being a candidate for one or more of the rules. Depending on what rules are being managed by rules manager 120 and evaluated at any given time by rules/decision engine module 130, the same received data may be evaluated and indexed differently. Further by way of example, depending on the elements of the received data that are being evaluated at any given time by rules/decision engine module 130, the same received data may be evaluated and indexed differently (e.g. indexed spatially, temporally or contextually). In various embodiments, the rules in a set of rules for a particular user, and/or group of users, and their respective fields will define a plurality of distributed data structures for identifying characteristics of the received data to determine whether the received data is a candidate for one or more of the rules and to minimize indexing requirements for the received data in memory. In various embodiments, the rules and their respective fields will define that elements of the received data that are identified as being a candidate for the rules will be placed in particular dimensional indexes (e.g. spatial, temporal, or contextual indexes). In some embodiments, rules managed by rules manager 120 and their respective fields will define that one or more received data elements that are identified as being a candidate for the rules are spatially indexed. In some embodiments, rules managed by rules manager 120 and their respective fields will define that one or more received data elements that are identified as being a candidate for the rules are temporally or contextually indexed. In various embodiments, rules managed by rules manager 120 and their respective fields can define a plurality of distributed data structures for indexing in memory.

Rules/decision engine module 130 analyzes received data to identify candidates for satisfying rules to optimize indexing and minimize any persistent storage requirements for the received data. For example, rules/decision engine module 130 can analyze received data using rules managed by rules manager 120 and their respective fields to identify and disregard spurious, or not relevant, data for the rules. In various embodiments, rules/decision engine module 130 can define that the distributed data structures for indexing received data that is identified as being a candidate for the rules in memory can be modified based on the received data that is indicated to be a candidate for the rules.

For example, a railroad company can define a rule for predicting where fires will likely start from trains operating on its tracks and define fields such as the hottest times of day (e.g. between 12 p.m. and 5 p.m.), dry areas, wind speeds of greater than 10 knots, humidity less than 30%, and maps of its train lines. This rule and its respective fields can define that received data is analyzed (e.g. filtered) to identify data that is a candidate for the rule (e.g. train data) and to eliminate or disregard data that is not a candidate for the rule provided that it is not a candidate for any other rule of a set of rules managed by rules manager 120. The rule and its respective fields, and the other rules managed by rules manager 120 and their respective fields, can also define that particular elements of the received train data that are identified as being a candidate for the rules are spatially indexed, that particular objects that have been identified as being a candidate for the rules are temporally indexed, and that particular objects that have been identified as being a candidate for the rules are contextually indexed such that they are mapped to contextual attributes in one or more distributed data structures in memory. Each respective rule and its respective fields then identify which indexes are evaluated in memory to identify an event indicating that the respective rule is satisfied. For example, the railroad company rule and its fields define that the spatially indexed data, temporally indexed data and/or contextually indexed data are evaluated (e.g. queried) to identify an event (i.e. all of the definitions of the rule are evaluated as true) such that the train data associated with train tracks in dry areas having the defined attributes of wind speed and humidity, and operating between 12 p.m. and 5 p.m., identifies an event as satisfying the rule.

In another example, an intelligence agency that receives intelligence that a terrorist has sabotaged a commercial 747's JP-5 fuel supply that is expected to take off between 8 and 11 a.m. Eastern time can define a rule to predict the most likely sabotaged 747 and define fields of plane type, airports, fuel type, 8 and 11 a.m. Eastern time, social media keywords of "fuel" or "gas" or "JP-5" within known locations of terror cells. This rule and its respective fields can define that received data is analyzed (e.g. filtered) to identify data elements that are candidates for the intelligence agency rule (e.g. plane data) and to eliminate data not associated with 747s or JP-5 fuel type to maximize disregarding of spurious data and minimize indexing of spurious and/or data not capable of satisfying the rule (provided that such data is not a candidate for other rules managed by rules manager 120). The intelligence agency rule and its respective fields and the other rules managed by rules manager 120 and their respective fields, can also define that elements of the received plane data that are identified as being a candidate for the rule (e.g. plane data) and possibly other rules of the set of rules managed by rules manager 120, is contextually indexed such that objects of the received plane data are mapped to contextual attributes in one or more distributed data structures in memory.

In various embodiments, rules/decision engine module 130 places data elements in distributed data structures in memory with an indicator of each identified rule for which the received data element is a candidate. In various embodiments, rules/decision engine module 130 places data elements in memory in one or more distributed data structures with an indicator (e.g. flag) for each rule that the data element is identified as being a candidate. For example, rules manager 120 can manage one hundred rules, and received data elements may be identified by rules/decision engine module 130 as being a candidate for rules 11, 43 and 81 of the defined rules managed by rules manager 120. Rules/decision engine module 130 can place the received data elements with respective indicators (e.g. R11, R43, R81) in one or more dimensional distributed data structures in memory. In some embodiments, rules/decision engine module 130 can, in communication with service core 150-$i$ and rules manager 120, place the received data elements in memory in respective distributed data structures defined in rules manager 120 for the respective rules for which the received data elements are identified as being a candidate for the rules managed by rules manager 120 for the respective users (i). In some embodiments, rules/decision engine module 130 can place elements of received data in distributed data structures in memory with an indicator (e.g. in a spatial, temporal, or contextual distributed data structure) for each respective rule that the received data is identified as being a candidate.

In various embodiments, when fields defined for respective rules are modified in rules manager 120, rules/decision engine module 130 can also modify a distributed data structure for indexing received data identified as being a candidate for such rules. In some embodiments, rules managed by rules manager 120 and their defined data sources can define the type of indexing for spatial, temporal or contextual elements of received data identified as being a candidate for the rules and/or previously indexed data from such defined data sources. In some embodiments, once rules/decision engine module 130 has analyzed received data and identified one or more respective rules from rules manager 120 for which the received data is a candidate, rules/decision engine module 130 can modify indexing for additional received data identified as being a candidate for the rules and/or previously indexed data to make further determinations of whether the rule is satisfied.

For example, a law enforcement agency may be interested in predicting where a drug drop will occur and can define a rule to correlate airplanes below a certain altitude to ships transiting in area of where a plane went below the certain altitude and can define fields such as the type of airplane, type of ship, origin of airplane, origin of ship, within 50 nautical miles, over the next three hours, etc. This rule and its respective fields (and other rules managed by rules manager 120 and their respective fields) can define that received data is analyzed (e.g. filtered) to identify data that is a candidate for the rule (e.g. airplane data) and to eliminate data not associated with a plane at an altitude below 10,000 feet and minimize evaluating spurious data (provided that it is not a candidate for any other rule managed by rules manager 120). The rule and its respective fields (and other rules managed by rules manager 120 and their respective fields) can also define that elements of received data that is identified as being a candidate for the rule (e.g. plane data) is contextually indexed to, for example, place elements of the data associated with a plane at an altitude below 10,000 feet in contextual distributed data structures in memory based on one or more contextual attributes of the data. In some embodiments, rules/decision engine module 130 has identified this law enforcement rule (and potentially other rules) from rules manager 120 for which the received, contextually indexed data is a candidate. In some embodiments, rules/decision engine module 130 can place in memory (e.g. in a contextually based distributed data structure) the received data that is identified as a candidate with an indicator for this (and any other) identified respective rule. The identified rule and its defined fields (in addition to other rules managed by rules manager 120 and their defined fields) can define that additional received data is analyzed to eliminate data not associated within a defined proximity (e.g. within 50 nautical miles) of the dynamic location (e.g. track) of the plane at an altitude below 10,000 feet (provided that the received data is not a candidate for other rules managed by rules manager 120) and also identifies data meeting such criteria as being a candidate for one or more rules including this law enforcement rule. The law enforcement rule and its respective fields (and other rules managed by rules manager 120 and their respective fields) can also define that elements of the received data that is identified as being a candidate for the law enforcement rule (and potentially other rules) is spatially indexed to place elements of data associated within a defined proximity (e.g.

within 50 nautical miles) of the dynamic location (e.g. track) of the plane at an altitude below 10,000 feet in one or more spatially distributed data structures in memory.

In some embodiments, rules/decision engine module 130 can identify this law enforcement rule from rules manager 120 for which the received, spatially indexed data is a candidate. The law enforcement rule and its defined fields can define that elements of additional received data are analyzed to eliminate data not associated with a ship type within the defined dynamic proximity (e.g. within 50 nautical miles) of the dynamic location (e.g. track) of the plane at an altitude below 10,000 feet (provided that it is not a candidate for any other rule managed by rules manager 120). The law enforcement rule and its defined fields, and the other rules managed by rules manager 120 and their respective fields, can define that elements of the received data that are identified as being a candidate for the law enforcement rule (and potentially other rules) are contextually indexed to place elements of data with a ship type within the defined dynamic proximity (e.g. within 50 nautical miles) of the dynamic location (e.g. track) of the plane at an altitude below 10,000 feet in one or more contextually distributed data structures in memory based on one or more contextual attributes of the data. In some embodiments, rules/decision engine module 130 can further identify this law enforcement rule from rules manager 120 for which the received, spatially and contextually indexed data is a candidate. Rules/decision engine module 130 can then evaluate the spatially, temporally and/or contextually indexed data in memory associated with the rules managed by rules manager 120 including the law enforcement rule to identify events as satisfying one or more of the respective rules in memory. Rules/decision engine module 130 can evaluate the spatially, temporally and/or contextually indexed data to determine whether the law enforcement rule is satisfied—i.e. a drug drop between the plane and the ship is likely to occur.

The inventors have determined that such cloud-based, in-memory distributed data structure indexing and data analysis techniques, which are not database (e.g. SQL database) limited, require virtual rather than network connections for data analysis, processing and retrieval operations, and provide index optimization, vastly improve and optimize storage, processing and time requirements and permit real-time rule satisfaction determination to enable predictive decision-making. The inventors have further determined that the methods and systems described herein can provide response times to meet a wide variety of industry requirements. For example, the methods and systems described herein can provide microsecond response times resulting in component adjustments to avoid equipment malfunction and damage in internal microcontrollers based on industry requirements and real-time streaming information received from internal circuits, millisecond response times resulting in device and/or emergency system adjustments to avoid equipment malfunction and damage in local devices based on industry requirements and real-time streaming information received from streaming sources such as sensors, second response times resulting in emergency system adjustments to avoid major equipment damage and/or small scale blackouts in network devices based on industry requirements and real-time streaming information received from power management units, minute response times resulting in normal and emergency system adjustments, market pricing and demand response to avoid major blackouts for system engineer users based on industry requirements and real-time streaming information received from power management units, network-attached sensors, and advanced metering infrastructure, hours response times for power pricing and demand response for electricity consumer users and electricity market participants to avoid blackouts, brownouts based on industry requirements and real-time streaming information received from power management units, network-attached sensors, advanced metering infrastructure, weather and event feeds, and longer response times (e.g. days, weeks, etc.)

In various embodiments, once rules/decision engine module 130 has analyzed received data, identified one or more respective rules from rules manager 120 for which the received data is a candidate, and indexed the received data in memory as a function of the managed by rules manager 120, rules/decision engine module 130 can evaluate additional data to identify elements of the additional data that are candidates for one or more rules managed by rules manager 120 (and eliminate or disregard elements of data that are determined to not be a candidate for any of the rules managed by rules manager 120), index the data elements (e.g. place in dimensional, distributed data structure in memory) that are identified as being candidates for one or more rules managed by rules manager 120 as a function of the one or more rules and their respective fields, and then determine whether the respective one or more rules are satisfied. In some embodiments, rules/decision engine module 130 can evaluate data elements placed in distributed data structures in distributed working memory to determine whether the respective one or more rules are satisfied and identify events as satisfying the one or more rules. In some embodiments, rules/decision engine module 130 can evaluate spatial, temporal and contextual data elements placed in data structures in distributed working memory to determine whether one or more rules managed by rules manager 120 are satisfied. In some embodiments, rules/decision engine module 130 can index events identified as satisfying one or more rules based on temporal, spatial or contextual elements. In some embodiments, rules/decision engine module 130 can store events in persistent storage. In some embodiments, rules/decision engine module 130 can evaluate data elements placed in distributed data structures in distributed working memory and/or indexed events to determine whether one or more rules are satisfied.

For example, a security company providing security at a forward operating base can create a rule to provide notification to the base security, automatically deploy/redirect the FMV or SIGINT assets in closest proximity to the base, and automatically engage physical security barriers at all points of entrance to the base, if a vehicle from a defined place of origin moves at a speed of more than 25 miles an hour within five miles of any perimeter of the base between 12 a.m. and 6 a.m.

Rules/decision engine module 130 can evaluate received data, and/or additional data (e.g. previously temporally, spatially or contextually indexed data per a rule-defined distributed data structure) to identify respective data elements as a candidate for the security company rule, e.g. data with a temporal element of between 12 a.m. and 6 a.m., and place such data identified as being a candidate for the rule (or other rules managed by rules manager 120) in a temporal index (e.g. temporal data structure in distributed working memory). Rules/decision engine module 130 can further evaluate received data, and/or additional data (e.g. previously temporally, spatially or contextually indexed data per a rule-defined distributed data structure) to identify respective data received with a spatial element of moving toward the base at a speed of more than 25 miles an hour within five miles of the base perimeter and place such data elements in memory in a spatial index (e.g. spatial data structure in distributed working memory). Rules/decision engine module 130 can evaluate received data, and/or additional data (e.g. previously temporally, spatially or contextually indexed data per a rule-defined distributed data structure) to identify respective data elements as a candidate for the security company rule, e.g. data with a contextual element of the defined place of origin, and place such data identified as being a candidate for the rule (or other rules managed by rules manager 120) in a contextual index (e.g. contextual data structure in distributed working memory). In some embodiments, the respective data elements are indexed with an indicator (e.g. R-Base) index entry to identify the respective data elements as being a candidate for the security company rule. In some embodiments, rules/decision engine module 130 can further evaluate received data, and/or additional data, to disregard data that is a not a candidate for the rules managed by rules manager 120 based on the rule fields and the temporal, spatial, and contextual elements of the data.

Rules/decision engine module 130 can evaluate whether the indexed data satisfies the rules managed by rules manager 120 including the security company rule (i.e. a vehicle moving toward the base within 5 miles of the base perimeter between the hours of 12 a.m. and 6 a.m. originated from an identified place of origin). If the security company rule is determined to be satisfied, rules/decision engine module 130 can identify an event as having satisfied the rule and can initiate the automatic notifications defined in the rule in communication with predictive service core 150-N, communications interface module 170 and user interface 110. In various embodiments, rules/decision engine module 130 can index events based on spatial, temporal or contextual elements in memory and/or store events in persistent storage for further rule evaluation. For example, rules/decision engine module 130 can index an event based on spatial elements (e.g. vehicle moving toward the base at a speed of more than 25 miles an hour within 5 miles of the base perimeter) and/or contextual elements (e.g. place of vehicle origin) in memory to evaluate whether one or more additional rules (e.g. other security company rules) are satisfied.

In various embodiments, rules/decision engine module 130 can create a relationship between one or more spatial, temporal or contextual elements of indexed data. For example, rules/decision engine module 130 can create a relationship between a spatial element of received data identified as being a candidate for the security company's rule described above (vehicle moving toward the base at a speed of more than 25 miles an hour within 5 miles of the base perimeter) that is spatially indexed as a function of the rules for which it is a candidate (including the security company's rules) and a contextual element of received data identified as being a candidate for one or more of the same rules (place of vehicle origin) that is contextually indexed as a function of the rules for which it is a candidate (including the security company's rules). In some embodiments, the relationship is a logical association of the data elements. Any suitable relationship to associate the data can be used. In some embodiments, rules/decision engine module 130 can create a relationship between indexed data that is evaluated as being a candidate for multiple rules of a rule set for a user and other indexed data that is evaluated as being a candidate for the same rules of the same rule set for the same user or the same group of users. In various embodiments, rules/decision engine module 130 can store the created relationship (e.g. in a distributed data structure) in memory. In some embodiments, rules/decision engine module 130 will automatically create such relationships. In other embodiments, rules/decision engine module 130 will suggest creation of relationships to a user via user interface 110. For example, rules/decision engine module 130 can suggest the relationship described above to the security company users but require acceptance by a user to create the relationship and/or store the relationship in memory.

In various embodiments, rules/decision engine module 130 can suggest a modification to a rule based on one or more created relationships. In some embodiments, rules/decision engine module 130 can suggest editing an existing rule or creating a new rule based on an existing rule. For example, rules/decision engine module 130 can suggest a modification to the rule for the security company providing security at the forward operating base based on a created relationship between a spatial element of indexed data identified as being a candidate for the security company's rule described above (vehicle moving toward the base at a speed of more than 25 miles an hour within 5 miles of the base perimeter) and a contextual element of indexed data identified as being a candidate for the same rule (place of vehicle origin). Rules/decision engine module 130 can suggest creating a new rule based on the existing rule to modify one or more temporal fields and one or more contextual fields to provide the same notification when the particular vehicle previously detected as satisfying the rule moves at a speed of greater than 20 miles an hour within five miles of any perimeter of the base between 6 a.m. and 12 a.m. Rules/decision engine module 130 can also suggest modifying the existing rule to modify one or more temporal fields and one or more spatial fields to provide the same notification when any vehicle from a defined place of origin moves at a speed of more than 25 miles an hour within three miles of any perimeter of the base between 12 a.m. and 8 a.m. In some embodiments, rules/decision engine module 130 can provide a rule suggestion to a user having a rule associated with the created relationship. In some embodiments, rules/decision engine module 130 can provide a rule suggestion to one or more users where the created relationship is associated with a rule defined by a different user.

In various embodiments, rules/decision engine module 130 can provide an indication that a rule is satisfied. In various embodiments, indications based on rule satisfaction are defined for a rule (e.g. via user interface 110). In some embodiments, indications can be the same for a set of rules, or a subset of a set of rules, for a user. In some embodiments, notifications can be different for each rule of a set of rules. In some embodiments, indications can be provided to only specified users of all of the users that are associated with a particular subscription and predictive service core 150-N of cloud 100. Referring now to FIG. 1, cloud computing environment 100 can also include communications interface module 170 communicating with predictive service core 150-N, rules/decision engine module 130, and/or user interface 110. Communications interface module 170 allows software and data to be transferred between service core 150-N, and/or streaming data module 140 and/or static data module 135, and/or external devices including, for example, devices associated with external sensors 112 and/or external assets 114. In various embodiments, communications interface module 170 provides machine-to-machine (MTM) communications such as, for example, in an Internet of Things (IoT) infrastructure. In various embodiments, communications interface module 170 provides indications (e.g. notifications, communications, and/or signals) to external devices based on indication specifications defined for rules created and defined in rules manager 120 for the user and when rules/decision engine module 130 provides an indication that a rule has been satisfied and/or an event has been created and/or identified.

Examples of communications interface module 170 can include a modem, Ethernet card, wireless network card, a Personal Computer Memory Card International Association (PCMCIA) slot and card, or the like. Software and data transferred via communications interface module 170 can be in the form of signals, which can be electronic, electromagnetic, optical, or the like that are capable of being received by communications interface module 170. These signals can be provided to communications interface module 170 via a communications path (e.g., channel), which can be implemented using wire, cable, fiber optics, a telephone line, a cellular link, a radio frequency (RF) link and other communication channels.

Any suitable indication for rule satisfaction can be provided. For example, a result can be displayed based on the rule (e.g. satisfaction of the rule is displayed on a user display via user interface 110) or a display can be changed based on the rule (e.g. user display can be changed from monitoring streaming data to a subset of the screen showing a location where the rule was determined to be satisfied via user interface 110). In various embodiments, a recommended action sequence can be displayed based on the rule (e.g. via user interface 110). In some embodiments, an action sequence can be initiated based on satisfaction of the rule. Any suitable action sequence can be recommended or initiated and is based on a user's definitions provided for the rule. For example, the action sequence can include collecting additional data having one or more spatial, temporal and contextual elements, queuing a data sensor, evaluating additional indexed data having one or more spatial, temporal and contextual elements, evaluating indexed events, evaluating indexed data as a function of a suggested rule, deploying an asset, rescheduling an asset, tipping a data sensor, transmitting a message, initiating a new data stream, changing a display, and other suitable actions sequences. In some embodiments, rules/decision engine module 130 can communicate an indication that a respective rule has been satisfied to communications interface module 170 and predictive service core 150-N, and communications interface module 170 provides indications (e.g. notifications, communications, and/or signals) to external devices based on indication specifications (e.g. based on notification fields) defined for the respective rule created and defined in rules manager 120 for the user.

In various embodiments, an alert can be provided based on the rule (e.g. alert provided to a user display via user interface 110). In some embodiments, a notification message based on the rule can be transmitted (e.g. to an external device via communications interface module 170). Any suitable notification message can be provided and is based on a user's definitions provided for the rule. In some embodiments, the notification message is a default notification message set by, for example, the administrator 108, for predictive service core 150-N. For example, the notification message indicating satisfaction of a respective rule initiated by rules/decision engine module 130 and transmitted via communications interface module 170 can be an electronic mail message, a telephone call, an alphanumeric page, a numeric page, a text message, a short messaging service message, a video message, a voice message, and other suitable notification messages.

In various embodiments, forensics module 160 manages forensics operations on received data from streaming data module 140 and/or static data module 135 including recording user-defined data streams, generated alerts or notifications, generated instances of rules being satisfied, generated instances of rule candidates being identified, etc. In various embodiments, forensics module 160 manages forensics operations on data identified as being a candidate for one or more rules. In various embodiments, forensics module 160 manages forensics operations on indexed data. In various embodiments, forensics module 160 stores data identified as being a candidate for one or more rules or indexed data in persistent storage. In various embodiments, forensics module 160 can record data for a predetermined or preset (e.g. service provider default) period of time or for a user-defined period of time received via user interface 110. In some embodiments, forensics module 160 can store recorded data in a database such as a NoSQL database.

In some embodiments, forensics module 160 can store recorded data in a non-transitory, tangible machine readable storage medium. The non-transitory, tangible storage medium can be a non-transitory computer readable storage medium. The computer readable medium can be a machine-readable storage device, a machine-readable storage medium, a memory device (e.g., flash or random access memory), a hard disk drive, a tape drive, an optical drive (such as, but not limited to CDROM, DVD, or BDROM) or the like, or a combination of one or more of them. In various embodiments, forensics module 160 stores data identified as being a candidate for one or more rules or indexed data in persistent storage. In various embodiments, forensic module 160 manages playback operations such that stored data is provided as an input to rules/decision engine module 130 to perform all or some of the functions described above for data received from streaming data module 140 and/or static data module 135 using rules from rules manager 120. In various embodiments, forensic module 160 manages playback operations and permits users to speed up or slow down playback of the stored data. For example, forensic module 160 can manage playback operations to permit a user to visually review 6 months of stored data via user interface 110 in a significantly shorter period of time such as 6 hours or 60 minutes. In some embodiments, results based on using stored data provided by forensics module 160 can be used to perform trend analysis, create rules, and/or revise existing rules such that the associated indices for such rules and/or spatial, temporal or contextual indices for received data identified as being a candidate for such rules can be further optimized. In some embodiments, a user can use data and trends provided by operations managed by forensics module 160 to build up a knowledge base of information.

For example, a user (e.g. a bus company) may want to know why they consistently receive complaints that one particular bus line is late along a particular bus route and at a particular time of day. There are a wide variety of factors that may contribute to the bus being late including traffic congestion, the driver making unauthorized stops, weather, construction, etc. A user can also select particular data sources to build up a knowledge base of historical data based on these determined factors. For example, a user can select police report feeds, construction feeds, weather feeds, traffic information feeds, driver social media feeds, etc. to provide inputs to, streaming data module 140 and static data module 135. A user can then define a period (e.g. six months) for forensics module 160 to perform recording operations on the selected data feeds. A user can create rules via user interface 110 designed to determine why the bus line is consistently late in arriving at bus stops along the particular route. For example, a bus company can create respective rules to provide an alert when any bus on XY5 line is more than 10 minutes behind schedule between Point A and Point B and between 6 a.m. and 10 a.m. or between 4 p.m. and 8 p.m. and radio station or social media or police scanner report a traffic accident within 5 miles of any bus location, or thunderstorms or snow showers are occurring, or social media or radio station or city planning reporting road closure within 10 miles of any location on bus route, or any bus driver job clock reporting late arrival, or any bus location more than 6 blocks off route, respectively. In various embodiments, rules/decision engine module 130 can identify received data that is a candidate for one or more rules managed by rules manager 120 including the bus company rules and forensics module 160 can record the data that is identified as being a candidate for the rules.

In various embodiments, forensics module 160 provides a playback feature to user interface 110 such that a user can select to playback information from one or more selected data sources from persistent storage and/or distributed data structures in memory. For example, a user can play back selected full motion video recorded using forensics module 160 while having rules/decision engine module 130 applies rules defined in rules manager 120 to selected data in "real time." In various embodiments, a user can build up a knowledge base of selected information for a predetermined period of time, and apply rules including spatial, temporal and contextual fields while playing back data including spatial, temporal and contextual elements stored in the knowledge base to perform trend or pattern analysis.

Figure 3A:
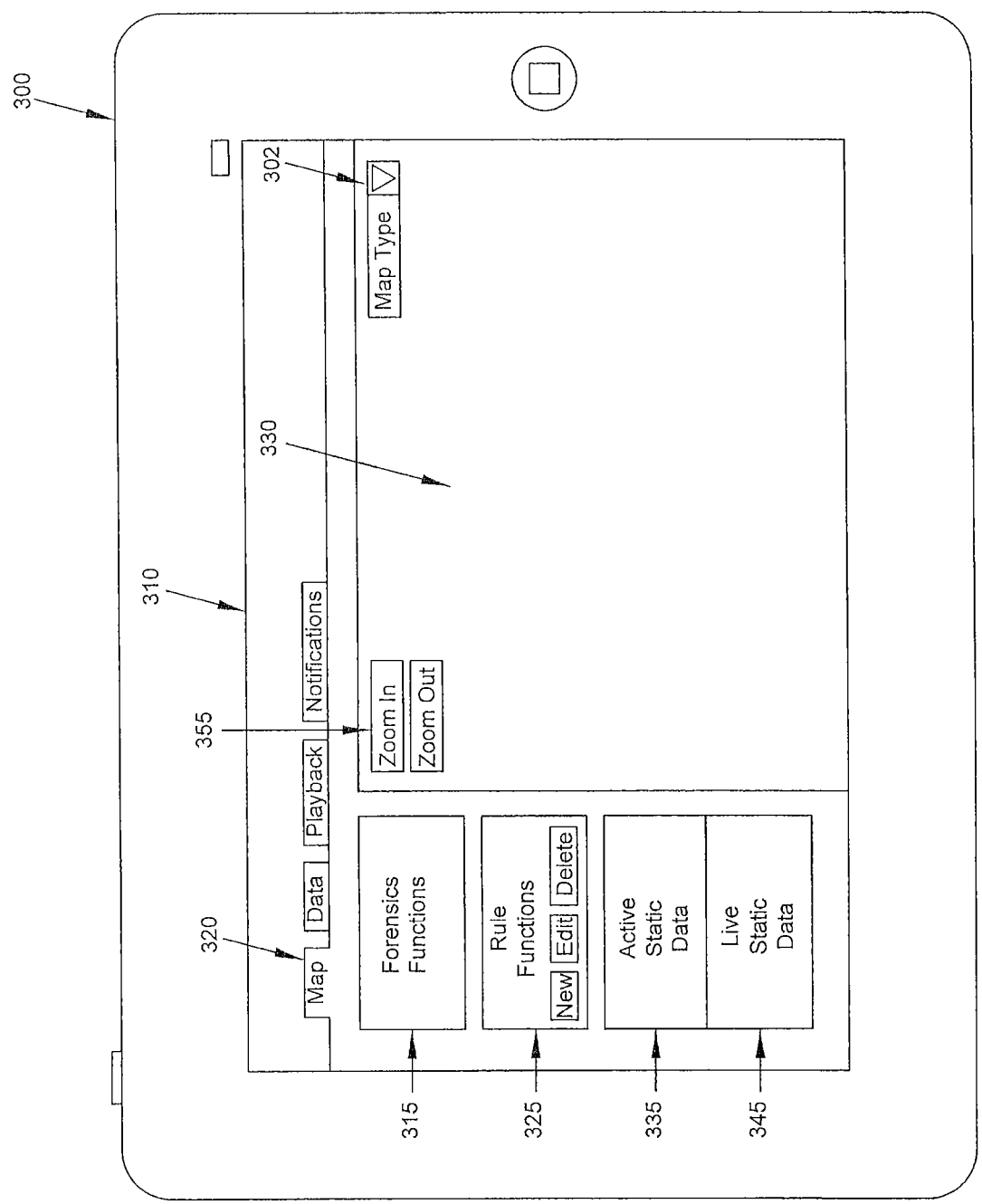
FIGS. 3A-3C are illustrative screenshots of examples of user interfaces according to some embodiments of the present subject matter.
Figure 3B:
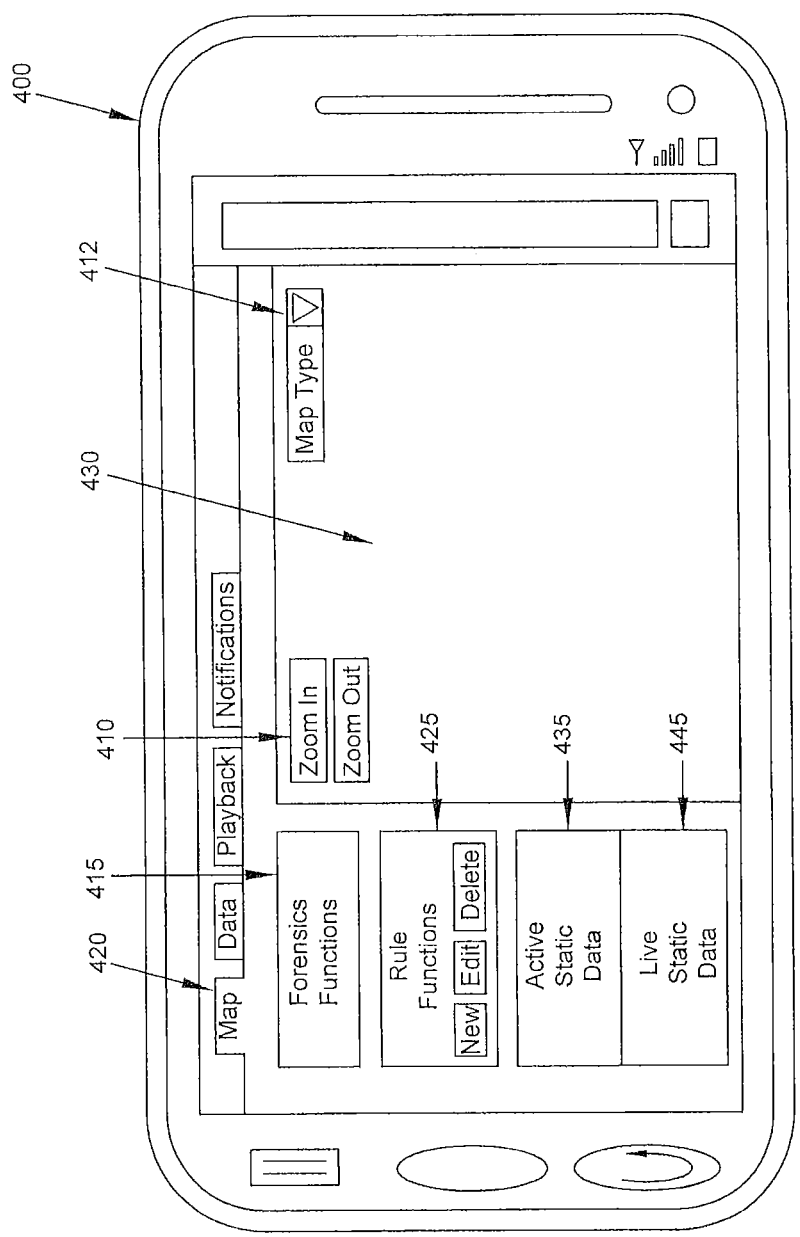
Figure 3C:
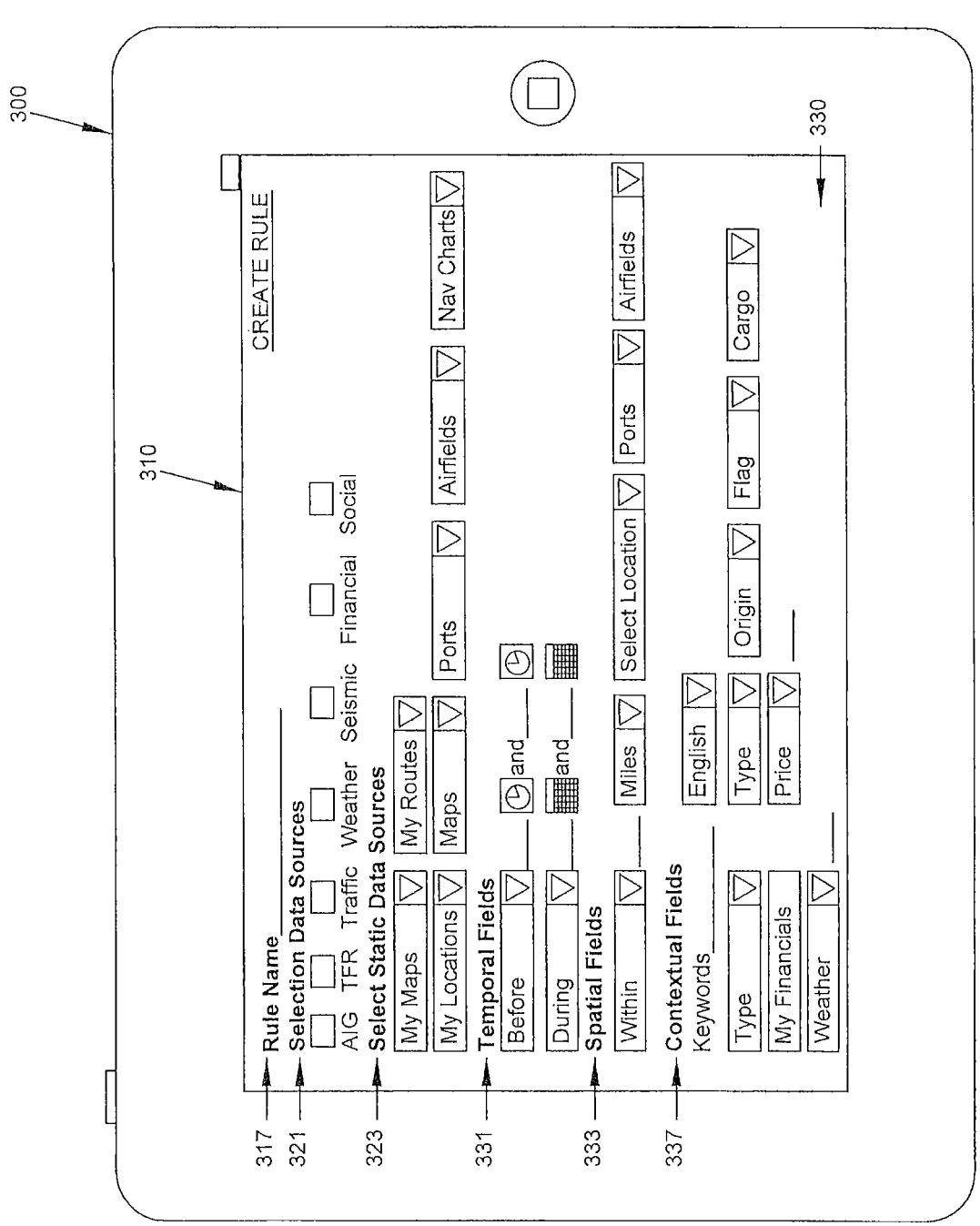

Referring now to FIGS. 3A-3C, illustrative screenshots according to some embodiments of the present subject matter are provided. At FIGS. 3A and 3B, illustrative devices are provided having a user interface to interface with cloud 100 according to some embodiments. As shown in FIGS. 3A-3C, a touch-screen display 310 is provided. In some embodiments, user can provide input to the computer 102 using a keyboard, pointing device, e.g., a mouse or a trackball, or other kinds of devices for interaction with user interface 110. Input from the user can be received in any suitable form, including acoustic, speech, or tactile input. In the illustrated embodiment, a device 300 including the touch screen display 310 is provided. As described above, device 300 can include any suitable device such as, for example, a microprocessor-based computer terminal, a mobile device, a kiosk, a personal digital assistant, a cellular phone, a tablet, an electronic personal planner, a slate tablet, a booklet computer, a convertible notebook, a phablet, a smart phone, a command and control system having a common operational picture (COP) or other situational awareness display, an automobile cockpit, a human-wearable computing device, etc. For example, an illustrative touch-screen display 310 can be any suitable touch screen display. For example, touch screen display can be a cathode ray tube (CRT) touch screen display, a liquid crystal touch screen display (LCD), a LCD resistive touch screen display, a LCD capacitive touch screen display, a LCD multi-touch capable touch screen display, etc. In some embodiments, display 310 is a display that is enabled by an input of the user that is non-tactile.

In the illustrated examples of FIGS. 3A and 3B, display 310 contains a data/map selectable parameter 320 which enables a user (i) to toggle between displaying a respective map and displaying respective data (e.g. data from one or more streaming data sources 140 and/or data from one more static data sources 135) from predictive service core 150-$i$. Any suitable selectable parameter (e.g. inline image) can be provided to toggle between various user interfaces including, for example, a portion to toggle between rule creation, rule modification, streaming data, map, static data, scrolling alert view, playback, video, help, chat, etc. user interfaces, and for a service provider to display various services provided at-cloud 100 via user interface 110. In the illustrated examples, a "map" display is selected at data/map selectable parameter 320 to display map data, e.g. map data selected for one or more rules defined by a user in rules manager 120. Various mapping functions can be provided to the user when a "map" display is selected at data/map selectable parameter 320 including, for example, zooming function 355, panning functions (e.g. absolute or relative north, south, east, west, up, down, left, right, etc.), map type selection 302 (e.g. maps defined by the user for a particular rules, maps with or more overlays, satellite imagery, map grids, navigational charts, etc.) including a drop-down or other selection-type menu (e.g. spin box, text box, etc.), and any suitable mapping functions.

As shown in FIGS. 3A and 3B, display 310 can include various menus for selection by the user to display various features provided by predictive service core 150-N including, for example, forensics functions 315 to enable the user to interface with forensics module 160 and provide various forensics-based services to the user such as playback services, trend/pattern analysis services, etc., rule functions 325 to enable the user to interface with rules manager 120 and provide various rule-based services to the user such as creating new rule services, editing or modifying existing rule services and deleting existing rule services, active static data services 335 to enable the user to interface with active data sources 140 including in connection with rules manager 12Q, rules/decision engine module 130, and/or predictive service core 150-N and provide various static data services such as viewing active static data selected for one or more rules defined by the user, viewing active static data that is overlaid by streaming data determined to be a candidate for one or more rules defined by the user, viewing active static data that is overlaid by streaming data that is determined to have satisfied a rule, etc., active streaming data services 345 to enable the user to interface with streaming data sources 140 including in connection with rules manager 120, rules/decision engine module 130, and/or predictive service core 150-N and provide various streaming data services such as viewing active streaming data selected for one or more rules defined by the user, viewing active streaming data that is determined to be a candidate for one or more rules defined by the user, viewing active streaming data that is determined to have satisfied a rule, etc., notification services (not shown) to enable the user to interface with communications interface 170 including in connection with rules manager 120 and/or rules/decision engine module 130 and provide various notification services such as defining and/or modifying notifications for new or existing rules, viewing one or more notifications of rules being satisfied, etc. Display 310 can include any suitable menu for displaying and providing a user interface for one or more services provided by predictive service core 150-N.

Referring now to FIG. 3C, an example of a user interface to interface with rules manager 120 and create a rule using device 300 and via display 310 is provided. In various embodiments, a user interface for creating a rule can be provided when a user selects "new" on rule function 325 of FIGS. 3A and 3B. In the illustrated example, a user is provided with various fields to input information to define the fields of the rule, including multiple spatial, temporal and contextual data fields for the rule. The user can input information into one or more of the fields using any suitable method including, for example, a spin box 540, a text box for tactile entry by a user such as for example, by a touch screen keyboard that is provided in response to a user selection of a text box or a keyboard that is part of a device (e.g. 300) or peripheral to the device (e.g. 300), a calendar inline image that can provide a touch screen calendar in response to a user selection of the calendar inline image, a clock inline image that can provide a touch screen clock in response to a user selection of the clock inline image, a drop-down or other selection-type menu, etc. In the illustrated example, a user can input a rule name for example using a rule name selectable parameter 317 that can be, for example, a text box activated by a touch screen keyboard or keyboard peripheral to device 300, input and select data sources for example using live 321 and static 323 data source selectable parameter to select data sources having spatial, temporal and contextual data elements for the new rule, input one or more temporal fields for the new rule for example using one or more temporal field selectable parameters 331, input one or more spatial fields for the new rule for example using one or more spatial field selectable parameters 333, input one or more contextual fields for the new rule for example using one or more contextual field selectable parameters 337, input a notification field for the new rule using a notification field selectable parameter (not shown), and/or input additional suitable fields using any suitable selectable parameter.

Figure 4:
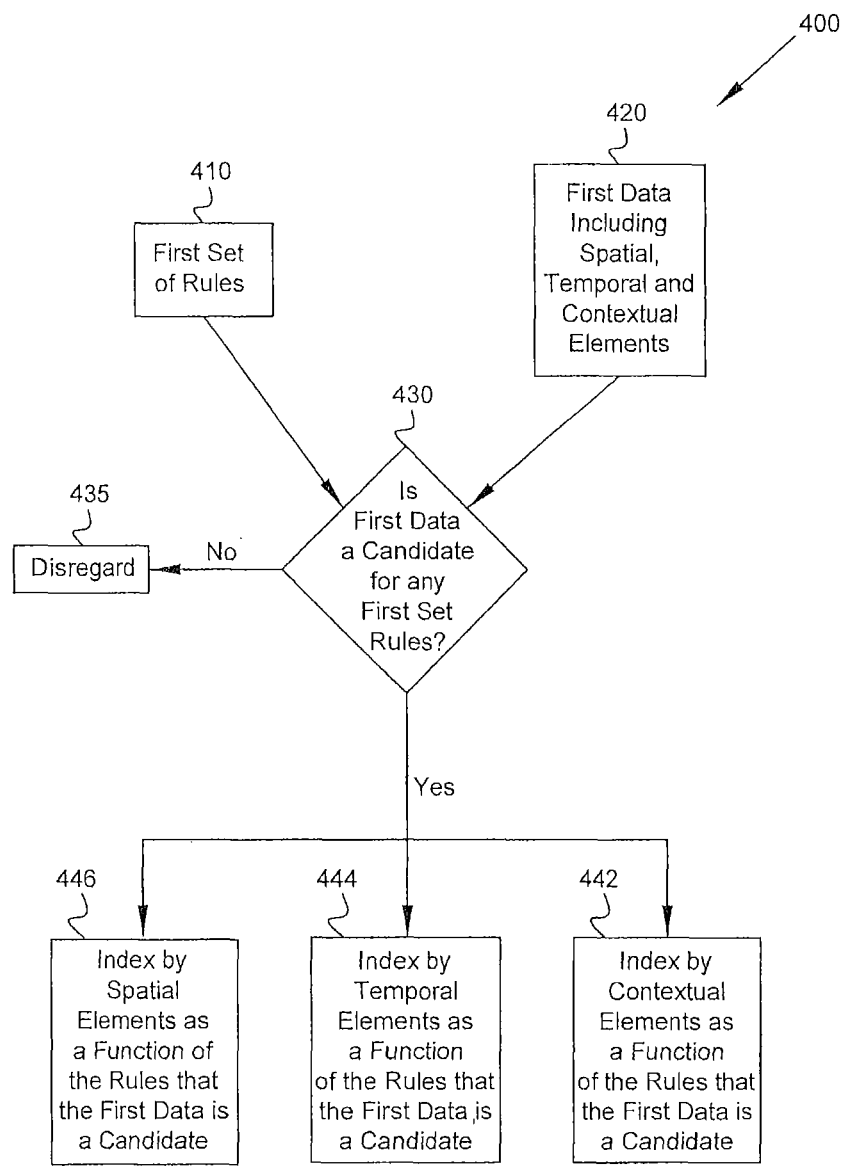
FIG. 4 is a flow chart illustrating a computer-implemented method of enabling predictive decision-making.

Referring now to FIG. 4, a computer-implemented method 400 of enabling predictive decision-making is provided. At block 410, a first set of rules is received. In various embodiments, a first set of rules can include rules associated with, and defined by, a user via user interface 110 and communicated to rules manager 120. In various embodiments, the first set of rules can be stored in a rules database of rules manager 120 associated with a user or a group of users. At block 420, first data comprising spatial, temporal and contextual elements is received. For example, first data can be received in cloud 100 via streaming data module 140 and static data module 135 and can include spatial, contextual and temporal parameters. In some embodiments, a user can define live and static data sources for the first set of rules using user interface 110 (e.g. FIG. 3C). In some embodiments, the first data can be received from one or more sensors. In some embodiments, the one or more sensors can provide a real-time information feed such as, for example, a weather, air traffic, vehicular traffic, video, audio, asset location, shipping, seismic, rail, global positioning, signals intelligence, financial, market, social media or other suitable real-time information feed. In some embodiments, each of the one or more sensors provide a real-time information feed for a dynamic (e.g. moving in space or time) source.

At block 430, the first data is evaluated, e.g. via rules/decision engine module 130, and each rule of the first set for which the received first data is determined to be a candidate is identified. At block 435, if first data is not determined to be a candidate for any rule of the first set of rules, it is disregarded. In various embodiments, spatial, temporal and/or contextual elements of the first received data that is identified as being a candidate for one or more rules of the first set is indexed in memory (e.g. placed in a data structure in distributed working memory) as a function of the one or more rules. In some embodiments, the elements are indexed with an indicator of each identified rule for which the received first data is a candidate. In some embodiments, rules manager 120 creates a distributed data structure in memory for one or more of the respective rules of the first set. In various embodiments, the first data is evaluated to determine whether it is a candidate for the one or more respective rules using the created data structures. In various embodiments, a rule and its respective fields can define its distributed data structure for evaluating received data to determine whether the rule is satisfied to optimize indexing operations and minimize storage requirements. At blocks 442, 444, 446, if the first received data is determined to be a candidate for one or more rules of the first set, the first received data is indexed by its temporal, spatial and contextual elements as a function of the identified one or more rules. In various embodiments, each identified rule defines the respective indexing for the data elements identified as candidates for the identified rules. In some embodiments, each identified rule and the type of data and/or data element content defines the respective indexing for the data elements identified as candidates for the identified rules In various embodiments, one or more spatial, temporal or contextual data structures are dynamically created in memory as a function of the identified rules for which the received data is a candidate. In some embodiments, if the first received data is determined to be a candidate for one or more rules (e.g. rule 1, rule 2, and rule 3), the elements of the first received data are indexed in memory with an indicator of each identified rule for which the received first data is a candidate (e.g. rule 1, rule 2, and rule 3).

For example, a law enforcement agency can define a set of rules for various services it provides, for example, using user interface 100 and rules manager 120. This first set of rules can be received into the cloud 100 and stored, for example, in a database operated using rules manager 120. For example, one rule of the first set of rules (e.g. Rule "DD") can be defined to predict where a drug drop will occur (e.g. correlate aircraft below a certain altitude to ships transiting in area of where a plane went below the certain altitude) and can define fields such as the type of airplane (e.g. single engine aircraft, Cessna, Adam), type of boat (e.g. power boat, cigarette boat), origin of airplane (e.g. Mexico), origin of ship (Florida, California, Texas, Louisiana), altitude of less than 10,000 feet, within 50 nautical miles, over the next twenty four hours, etc. Data can be received into the cloud 100 having one or more spatial, temporal or contextual elements from one or more streaming data sources (e.g. air traffic radar, TFR, shipping radar, AIS, coastal sensors, UAV, FMV, drones, FAA data feeds, U.S. Coast Guard data feeds, intelligence data feeds, etc.) and one or more static data sources (e.g. nautical charts, aviation charts, etc.). First data can be received that consists of real-time reporting of various aircraft in flight.

For example, one rule of the first set of rules (e.g. Rule "DP") can be defined to predict where dropped drugs will be picked up by a boat (e.g. correlate track of aircraft below a certain altitude with a track of one or more boats transiting in an area of where the boat track will pass within an automatically adjustable predetermined distance (e.g. adjustable range based on current, wind, sea state, etc. updates) such that the boat would pick up any drug packages dropped by the plane into the water at any point along the track of the aircraft based on determined distance and direction of a potentially floating dropped drug package) within an identified date/time window (e.g. 6 hours)) and can define fields such as the type of airplane (e.g. single engine aircraft, Cessna, Adam), type of boat (e.g. power boat, cigarette boat), origin of airplane (e.g. Mexico), origin of ship (Florida, California, Texas, Louisiana), altitude of less than 10,000 feet, within 50 nautical miles, track of the airplane, track of the boat, wind speed, wind direction, surface current speed, surface current direction, weather, sea state, date/time window (six hour window from 1900-0100 on consecutive days), etc. Data can be received into the cloud 100 having one or more spatial, temporal or contextual elements from one or more streaming data sources (e.g. air traffic radar, TFR, shipping radar, AIS, coastal sensors, UAV, FMV, drones, FAA data feeds, U.S. Coast Guard data feeds, intelligence data feeds, weather sensors streaming feeds, NOAA data feeds, etc.) and one or more static data sources (e.g. nautical charts, aviation charts, etc.). First data can be received that consists of real-time reporting of the respective tracks of potential drug packages dropped in the water beneath the respective tracks of various aircraft in flight flying below 10,000 feet that is automatically adjustable based on weather and oceanographic conditions including surface current speed and direction, and wind speed and direction.

Rules/decision engine module 130 can evaluate the received first data to identify each rule of the first set of rules for which the received first data is a candidate. For example, rules/decision engine module 130 can evaluate the received first data to identify Rule "DD" if the received first data is relevant or responsive to one or more fields defined for Rule "DD" (e.g. defined type of airplane, defined type of boat, defined origin of airplane, defined origin of ship, defined altitude of less than 10,000 feet, defined spatial relationship of within 50 nautical miles, defined temporal field of over the next twenty four hours, etc.). For example, rules/decision engine module 130 can evaluate the received first data to identify Rule "DP" if the received first data is relevant or responsive to one or more fields defined for Rule "DP" (e.g. defined type of airplane, defined type of boat, defined origin of airplane, defined origin of ship, defined altitude of less than 10,000 feet, defined spatial relationship of within 50 nautical miles, defined date/time window, etc.). Rule "DD" and/or Rule "DP" can define in rules manager 120 that received first data is evaluated to eliminate data not associated with a defined type of plane at an altitude below 10,000 feet and minimize indexing of spurious data in memory (provided that the received first data is not a candidate for any other rule managed by rules manager 120). Rules/decision engine module 130 can disregard received first data and not index in memory received first data that is not a candidate of rule "DD" or rule "DP" (or any other rule of the first set of rules) and filter out data that is not associated with the defined type of aircraft or that has an altitude of greater than 10,000 feet (provided that data is not a candidate for any other rule managed by rules manager 120). Rules/decision engine module 130 can contextually index (e.g. place in a contextually distributed data structure defined by rule "DD" and other rules for which the received first data is a candidate) in memory the contextual attributes of the received first data (data that is associated with the defined type of aircraft and is traveling at an altitude less than 10,000 feet). In some embodiments, contextual elements of the received first data can be indexed with an indicator (e.g. R-DD) for Rule "DD" (or e.g. R-DP for Rule "DP").

The respective received data can be received out of synchronization temporally but within a date/time window defined for the respective rule (e.g. Rule "DD"). For example, the rule and one or more of its respective fields can define a dynamically changing date/time window based on various received data elements including, by way of example, time, speed of plane or boat, course of speed or boat, track of speed or boat, current, wind, weather patterns, etc., to synchronize the received data. For example, the respective rule can be defined to predict where a drug drop will occur (e.g. Rule "DD") or where a pickup of dropped drugs will occur (Rule "DP") (e.g. correlate track of aircraft below a certain altitude received at a first date and time (e.g. June 29 at 2300) with a track of one or more boats transiting in an area of where the plane track will intersect (and/or pass within a predetermined distance (e.g. less than 1 nautical mile (nm)) a boat track at a second date and/or time (e.g. June 30 at 0200) but within an identified date/time window (e.g. 6 hours) and as a function of receiving data on wind speed, wind direction, current speed, current direction, weather patterns, etc. during the time window). In various embodiments, the identified rule and its defined fields can define that spatial and/or contextual elements of received data indexed in memory can be temporally synchronized with spatial and/or contextual elements of other received data based on location, course, speed, wind speed, current, tide, and other atmospheric conditions (e.g. gulf stream conditions) determined at respective points in time.

Figure 5:
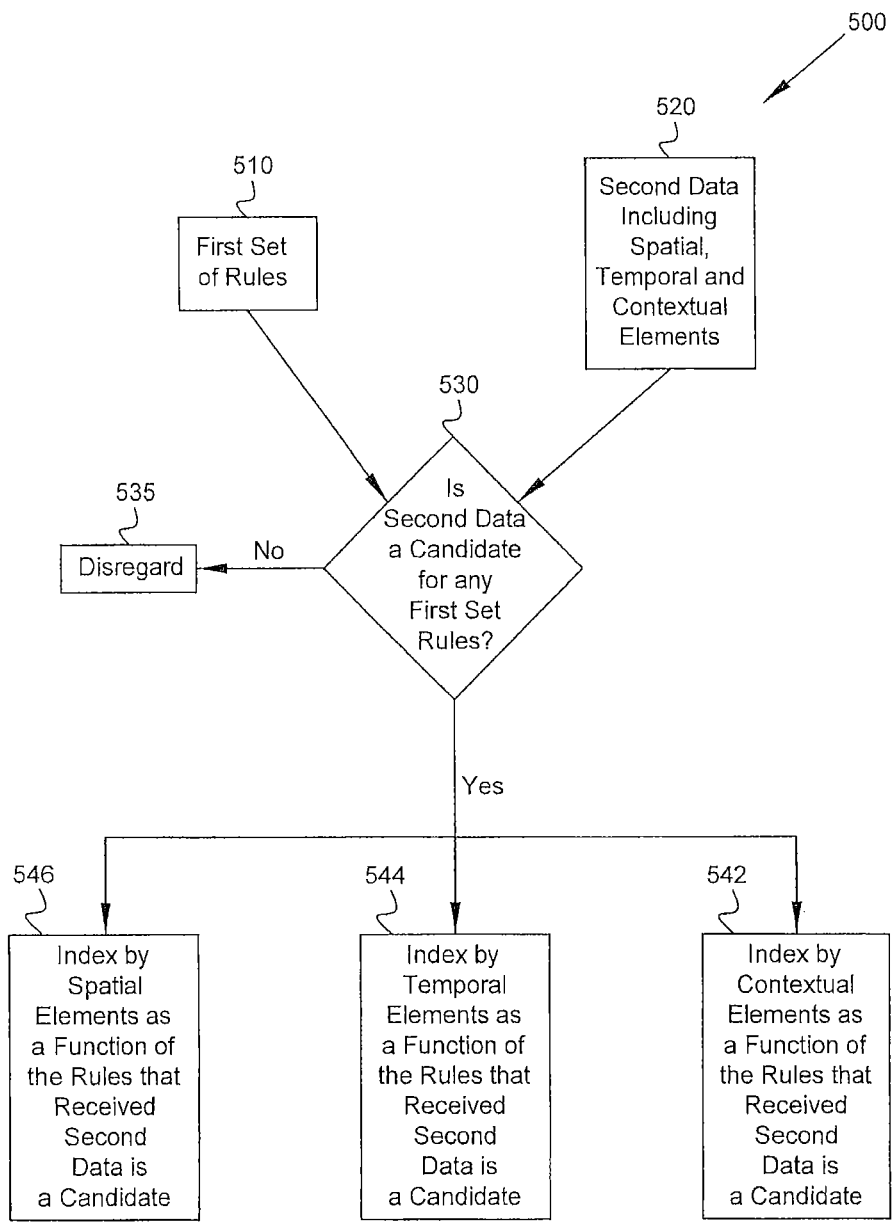
FIG. 5 is a flow chart illustrating a computer-implemented method of enabling predictive decision-making according to some embodiments.

With reference now to FIG. 5, a computer-implemented method 500 of enabling predictive decision-making is provided. At block 510, a first set of rules is provided as described above for block 410. At block 520, second data including spatial, temporal and contextual elements is received. For example, in some embodiments, a user can define live and static data sources for the first set of rules using user interface 110 (e.g. FIG. 3C). In some embodiments, static data associated with the first set of rules is received and one or more spatial elements of the received second data are related to the received static data. At block 530, the second data is evaluated, e.g. via rules/decision engine module 130, and each rule of the first set for which the received second data is determined to be a candidate is identified. At block 535, if second received data is not determined to be a candidate for any rule of the first set of rules, it is disregarded. In various embodiments, spatial, temporal or contextual elements of the second received data that is identified as being a candidate for one or more rules of the first set is indexed in memory as a function of each identified rule for which the second received data is determined to be a candidate. In some embodiments, the respective elements are indexed with an indicator of each identified rule for which the received second data is a candidate. At blocks 542, 544, 546, if the second received data is determined to be a candidate for one or more rules of the first set, the second received data is indexed by its temporal, spatial and contextual elements as a function of the identified one or more rules.

Figure 6:
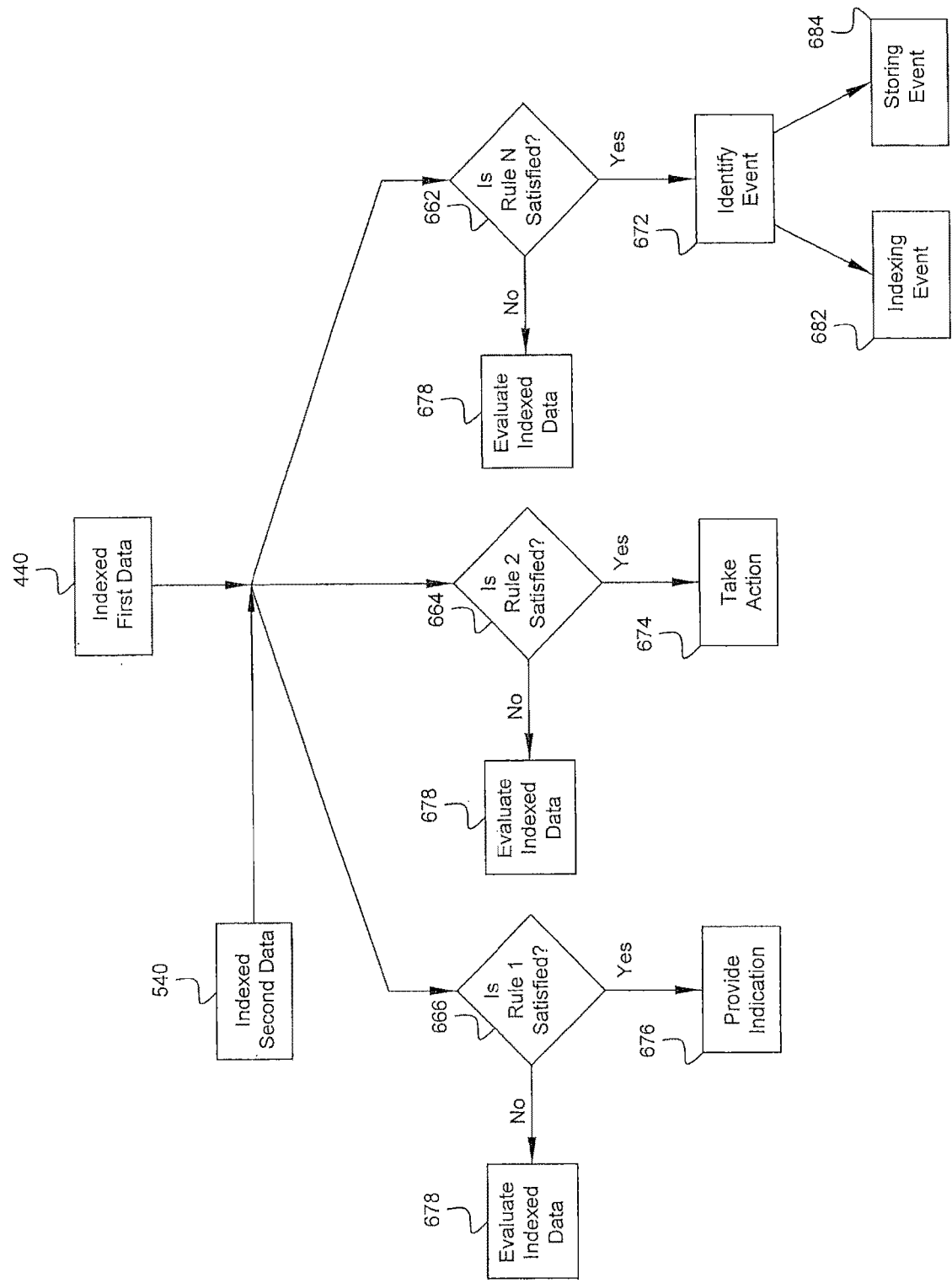
FIG. 6 is a flow chart illustrating a computer-implemented method of enabling predictive decision-making according to some embodiments.

Referring now to FIG. 6, a computer-implemented method 600 of enabling predictive decision-making is provided. At blocks 440 and 540, first received data and second received data determined to be a candidate for one or more rules of the first set is indexed in memory by its respective spatial, temporal or contextual elements as a function of the one or more rules. At block 666, where rule 1 is one of the rules for which the received first data and received second data is identified as being a candidate, the indexed first and second data elements are evaluated in memory to determine if rule 1 is satisfied (i.e. identify an event as satisfying rule 1). For example, rules/decision engine module 130 can evaluate the indexed first and second data elements in memory to determine if the respective rule is satisfied. At block 678, if no events are identified as satisfying rule 1, the evaluation of indexed data continues. At block 676, an indication that Rule 1 is satisfied is provided. For example, if rules/decision engine module 130 determines that a rule (e.g. rule 1) is satisfied based on its evaluation of the spatially, temporally and/or contextually indexed elements of the first and second data, rules/decision engine module 130 and communications interface module 170, can communicate an indication that the respective rule has been satisfied. In various embodiments, notification fields are input by the user via user interface 110 during the rule creation and/or editing process.

At block 664, where rule 2 is one of the rules for which the received first data and received second data is identified as being a candidate, the indexed first and second data elements are evaluated in memory to determine if rule 2 is satisfied (i.e. identify an event as satisfying rule 2). At block 678, if no events are identified as satisfying rule 2, the evaluation of indexed data continues. At block 674, if rule 2 is determined to be satisfied, an action is taken. For example, if rules/decision engine module 130 determines that a rule (e.g. rule 2) is satisfied based on its evaluation of the spatially, temporally and/or contextually indexed elements of the first and second data, rules/decision engine module 130 and communications interface module 170, can take an action based on the respective rule being satisfied. In various embodiments, notification fields, including fields to define an action automatically taken, or recommended, upon satisfaction of a respective rule (e.g. rule 2) are input by the user via user interface 110 during the rule creation and/or editing process. For example, an action automatically taken, and/or recommended to a user, can include displaying a result based on the rule, changing a display based on the rule, providing an alert based on the rule, transmitting a notification message based on the rule, collecting additional data having one or more of a spatial, temporal and contextual elements, queuing a data sensor, deploying an asset, rescheduling an asset, transmitting a message, evaluating additional indexed data having one or more spatial, temporal and contextual elements, evaluating indexed data as a function of a suggested rule, tipping a data sensor, transmitting a message, initiating a new data stream, changing a display and other suitable actions.

At block 662, where rule N is one of the rules for which the received first data and received second data is identified as being a candidate, the indexed first and second data elements are evaluated in memory to determine if rule N is satisfied (i.e. identify an event as satisfying rule N). At block 678, if no events are identified as satisfying rule N, the evaluation of indexed data continues. At block 672, if rule N is determined to be satisfied, an event is identified. At block 682, the identified event is indexed as a function of its spatial, temporal and/or contextual elements. At block 684, the identified event is stored in persistent storage. In some embodiments, if rule N is determined to be satisfied, a relationship is created. For example, rules/decision engine module 130 can create a relationship between two or more elements of the indexed data if it determines that a rule of the first set (e.g. rule N) is satisfied.

For example, second data can be received into cloud 100 that consists of real-time reporting of various ships and boats in transit (e.g. from one or more streaming data sources into streaming data module 140). Rules/decision engine module 130 can evaluate the received second data to identify each rule of the first set of rules for which the received second data is a candidate. For example, rules/decision engine module 130 can evaluate the received second data to identify Rule "DD" if the received second data is relevant or responsive to one or more fields defined for Rule "DD". Based on rules/decision engine module 130's evaluation of the received second data, received second data not associated within a defined proximity (e.g. within 50 nautical miles) of the dynamic location (e.g. track) of the plane(s) operating at an altitude below 10,000 feet can be disregarded or eliminated to minimize indexing operations of spurious data in memory (provided it is not a candidate for other rules managed by rules manager 120). Rules/decision engine module 130 can disregard received second data and not index received second data that is not a candidate of rule "DD" (or any other rule of the first set of rules) and filter out data that is not associated with the defined proximity (e.g. 50 nautical miles) to the planes(s) operating at an altitude below 10,000 feet. The received second data identified as bring a candidate for Rule "DD" (and other rules of the first set) can be indexed by its spatial, temporal or contextual elements as a function of the definitions of Rule "DD" (and the definitions of the other rules for which the received second data is a candidate). For example, Rule "DD" and the other rules for which the received second data is identified as a candidate can define in rules manager 120 that spatial elements of data received into cloud 100 that is associated within a defined proximity (e.g. within 50 nautical miles) of the dynamic location (e.g. track) of the plane(s) operating at an altitude below 10,000 feet is spatially indexed in memory (e.g. place in a spatially distributed data structure defined by rule "DD" and other rules for which the received first data is a candidate) by rules/decision engine module 130. In some embodiments, rules/decision engine module 130 can index in memory spatial elements of the received second data with an indicator R-DD.

For example, rules/decision engine module 130 can evaluate the received second data to identify Rule "DP" if the received second data is relevant or responsive to one or more fields defined for Rule "DP". Based on rules/decision engine module 130's evaluation of the received second data, received second data not associated within a defined proximity (e.g. within 10 nautical miles) of the dynamic location (e.g. track based on weather and oceanographic conditions including surface current speed and direction, and wind speed and direction) of the potential drug packages dropped in the water beneath the respective tracks of various aircraft operating at an altitude below 10,000 feet can be disregarded to minimize indexing of spurious data in memory. Rules/decision engine module 130 can disregard received second data and not index received second data that is not a candidate of rule "DP" (or any other rule of the first set of rules) and filter out data that is not associated with the defined proximity (e.g. 10 nautical miles) to the potential drug packages dropped in the water beneath the respective tracks of various aircraft operating at an altitude below 10,000 feet. Rules/decision engine module 130 can spatially index (e.g. place in a spatially distributed data structure defined by rule "DP" and other rules for which the received second data is a candidate) in memory the spatial elements of the received second data (associated within a defined proximity (e.g. within 10 nautical miles) of the dynamic location (e.g. track based on weather and oceanographic conditions including surface current speed and direction, and wind speed and direction) of the potential drug packages dropped in the water beneath the respective tracks of various aircraft operating at an altitude below 10,000 feet). In some embodiments, spatial elements of the received second data can be indexed with an indicator R-DP.

Rules/decision engine module 130 can evaluate the contextually indexed first data attributes (data that is associated with the defined type of aircraft and is traveling at an altitude less than 10,000 feet) and the spatially indexed second received data elements (boat transiting within 50 nautical miles of the dynamic location of the plane(s) operating at an altitude below 10,000 feet) to determine whether Rule "DD" is satisfied—i.e. a drug drop between the plane and the ship is likely to occur—and to determine whether other rules for which the received first and second data is a candidate are satisfied. Rules/decision engine module 130 can evaluate whether the spatial, temporal and contextual data elements of the indexed first data and indexed second data meet all of the definitions of the required fields of Rule "DD". Rules/decision engine module 130 can identify an event that the spatial, temporal and contextual data elements of the indexed first data and indexed second data establish that the aircraft operating below 10,000 feet originated in Mexico and is a Cessna, that the boat within 50 nautical miles of the aircraft is a power boat and originated in California, and that the data is real-time (occurring within the defined temporal definitions of the rule). Based on this evaluation, rules/decision engine module 130 can provide an indication that Rule "DD" is satisfied. Rules/decision engine module 130 can provide an alert or transmit a notification message to the law enforcement agency users of the imminent drug drop, can change a display at a device of the law enforcement agency users, can automatically deploy an asset (e.g. UAV) in close-proximity to the location of the aircraft and ship to collect intelligence and/or display FMV of the ship and/or aircraft, etc.

Rules/Decision engine module 130 can evaluate the spatially, temporally and/or contextually indexed first data elements in memory (dynamic data that is associated with the track of a potential drug package dropped beneath a defined type of aircraft that is traveling at an altitude less than 10,000 feet) and the spatially indexed second data elements (boat transiting within 10 nautical miles of the dynamic location of the track of the potential drug package dropped beneath the aircraft operating at an altitude below 10,000 feet) to determine whether Rule "DP" is satisfied—i.e. a drug pickup by a boat of a prior drop from the plane is likely to occur (and other rules for which the first and second received data is a candidate). Rules/decision engine module 130 can evaluate whether the spatial, temporal and contextual data elements of the indexed first data and indexed second data meet all of the definitions of the required fields of Rule "DP.". Rules/decision engine module 130 can identify an event that the spatial, temporal and contextual data elements of the indexed first data and indexed second data establish that the aircraft that operated below 10,000 feet between 1900 and 1915 originated in Mexico, is a Cessna, that the boat within 10 nautical miles of the track of the potential drug packages (determined by weather and oceanographic conditions including surface current speed and direction, and wind speed and direction) dropped between 1900 and 1915 from the aircraft is a power boat, originated in California, and has a track that will intersect (based on the boat course and speed) within 1 nm of the track of one or more of the potential drug packages during the defined time window (6 hours of 1900-1915), and that the data is real-time (occurring within the defined temporal definitions of the rule). Based on this evaluation, rules/decision engine module 130 can provide an indication that Rule "DP" is satisfied. Rules/decision engine module 130 can provide an alert or transmit a notification message to the law enforcement agency users of the imminent drug package pickup, can change a display at a device of the law enforcement agency users, can automatically deploy an asset (e.g. UAV) in close-proximity to the location of the boat and potential drug package to collect intelligence and/or display FMV of the boat and/or potential drug package, etc. In some embodiments, based on this evaluation, rules/decision engine module 130 can index the identified event by its spatial, temporal and/or contextual data elements and can use this indexed event to evaluate whether one or more additional rules are satisfied. In some embodiments, based on this evaluation, rules/decision engine module 130 can store the identified event in persistent storage.

Rules/Decision engine module 130 can create a relationship in memory between one or more respective spatial, temporal or contextual elements of the indexed first data (e.g. place of origin of the plane—Cabo San Lucas, Mexico) and one or more respective spatial, temporal or contextual elements of the indexed second data (e.g. place of origin of the boat—San Diego, Mexico) and can store the created relationship in memory (e.g. in a data structure defined for Rule DD and other rules for which the received first and second data is a candidate in distributed working memory). Rules/decision engine module 130 and rules manager 120 can provide a rule suggestion to the law enforcement agency users (e.g. via user interface 110) based on the created relationship (e.g. create a new rule to monitor and collect intelligence on ultra-light aircraft and power boats operating out of these two locations).

Rules/Decision engine module 130 can determine that the spatial, temporal and contextual data elements of the indexed first data and second data establish that the aircraft operating below 10,000 feet originated in Cuba and is a Cessna, that the boat within 50 nautical miles of the aircraft is a power boat and originated in Florida, and that the data is real-time (occurring within the defined temporal definitions of Rule-DD). Based on this evaluation, rules/decision engine module 130 can determine that Rule-DD is not satisfied. As shown in FIG. 6 at block 678, if rules/decision engine module 130 determines that Rule-DD (and other rules for which the received first and second data is identified as being a candidate) is not satisfied, rules/decision engine module will continue evaluating indexed data. Rules/decision engine module 130 can create a relationship between one or more respective spatial, temporal or contextual elements of the indexed first data (e.g. place of origin of the plane—Havana, Mexico) and one or more respective spatial, temporal or contextual elements of the indexed second data (e.g. place of origin of the boat—Miami, Fla.) and can store the created relationship (e.g. in a data structure defined for Rule DD and other rules for which the received first and second data is identified as being a candidate in distributed working memory). Rules/decision engine module 130 and rules manager 120 can provide a rule suggestion to the law enforcement agency users (e.g. via user interface 110) based on the created relationship (e.g. create a new rule to modify the place of origin of aircraft to include locations in Cuba).

Figure 7:
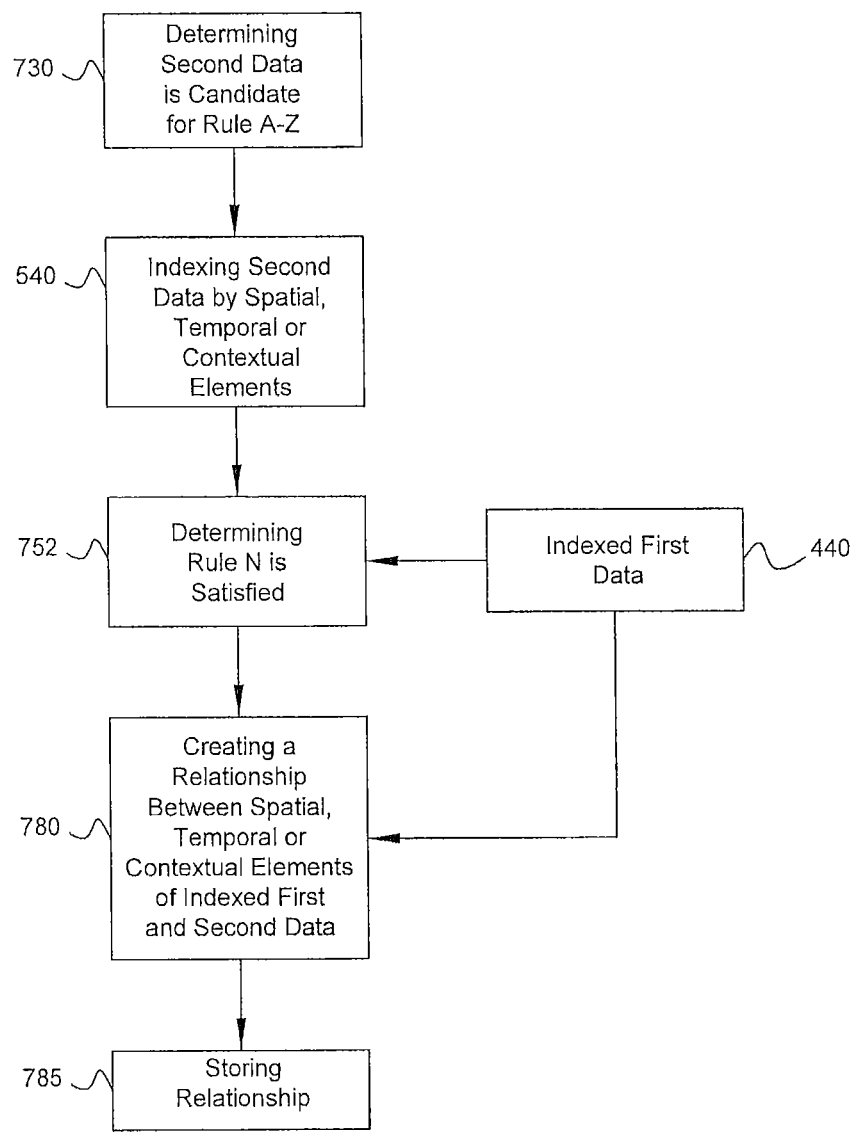
FIG. 7 is a flow chart illustrating a computer-implemented method of enabling predictive decision-making.

With reference now to FIG. 7 where a computer-implemented method 700 of enabling predictive decision-making is provided, second data is determined to be a candidate for rules A-Z (including Rule N) at block 730. At block 540, second data determined to be a candidate for such rules is indexed by its spatial, temporal or contextual elements as a function of the identified rules A-Z and their respective definitions. At block 752, rule N is determined to be satisfied using indexed second data determined to be a candidate for rules A-Z (block 540) and indexed first data determined to be a candidate for rules A-Z (block 440). In various embodiments, the indexed first data determined to be a candidate for rules A-Z was previously indexed by one or more of its spatial, temporal or contextual elements. At block 540, the second data determined to be a candidate for rules A-Z is indexed by one or more of its temporal, spatial or contextual elements as a function of the identified rules. In some embodiments, elements of the second data determined to be a candidate for rules A-Z can be placed in a distributed data structure in memory with an indicator of rules A-Z. In the illustrated embodiment, at block 780, a relationship between one or more respective spatial, temporal or contextual elements of the indexed and stored first and second data determined to be a candidate for rules A-Z, is created. At block 785, the created relationship is stored (e.g. in a distributed data structure) in memory. In various embodiments, a rule suggestion is provided (e.g. via rules manager 120 to a user via user interface 110) based on the created relationship. For example, a suggestion to modify an existing rule can be provided based on the created relationship. In various embodiments, the created relationship can be used to modify an existing rule of the same user or group of users. In some embodiments, a rule suggestion can be provided based on the created relationship to a different user or to an administrator.

For example, a user can define a rule to determine his or her favorite beach and may identify and define fields such as water temperature, common air temperature, single women between 25 and 30 active on social media on the beach, wave height, time of day, sand type and water visibility for the respective rule via user interface 110. The user understands these factors to be factors important to his decision of a favorite beach. The inventors have determined that the system and method described herein can analyze a user's identified and defined fields for a particular rule, and created relationships for the user and/or different users for similar rules, to provide rule suggestions to a user to improve a user's selection of fields for a rule and definitions associated with those fields and proactively assist the user in identifying what factors are important to the user. For example, a relationship may have been created between time of day specified by the user for the beach rule and highest rated outdoor bars/restaurants within 3 blocks of a beach for one or more other users. Rules/decision engine module 130 in communication with rules manager 120 can suggest a modification to the user's rule to include this field and/or suggest a definition for input for this field by the user.

In another example, a user can define a rule to manage when to carry his or her inhaler based on his current location, air quality, air temperature, humidity, time of day between traveling to and from the office, location of public transit routes, and location of office. One or more users can define additional similar rules to manage when to carry his or her inhalers and rules/decision engine module 130 can create relationships between one or more respective spatial, temporal or contextual elements of the first and second data determined to be a candidate for one or more of those rules (e.g. between an elevation of a location and an air quality percentage). Rules/decision engine module 130 in communication with rules manager 120 can suggest a modification to the user's rule on managing when to carry his or her inhaler based on created relationships of these other users to improve the user's rule or the user's definitions for fields of the rule.

Figure 9:
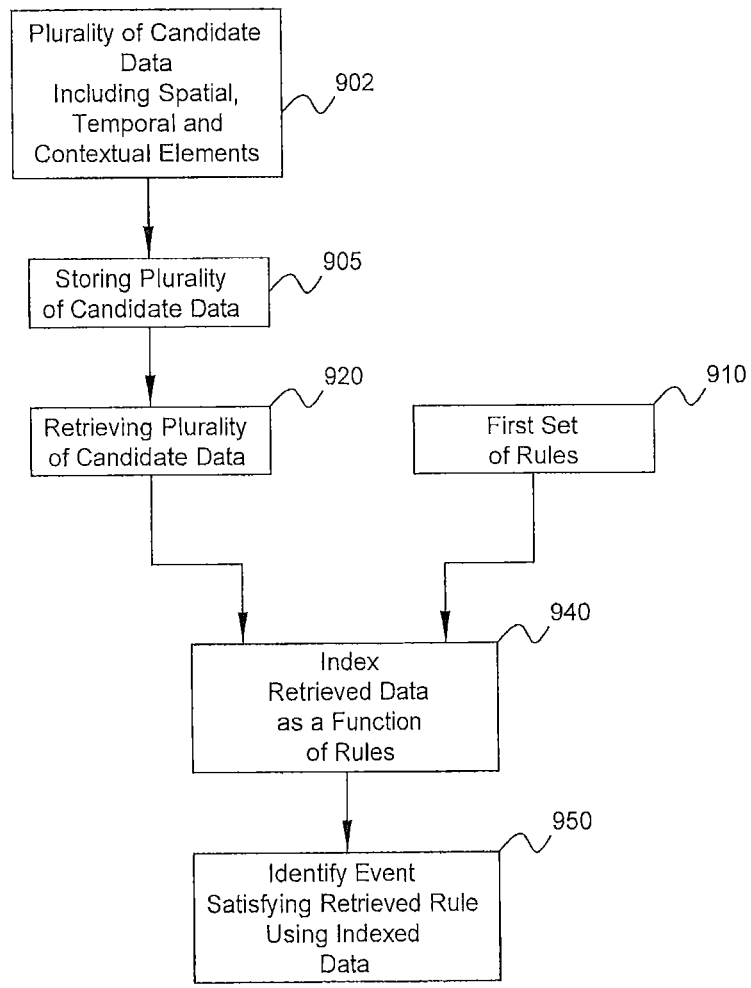
FIG. 9 is a flow chart illustrating a computer-implemented method of enabling predictive decision-making.

With reference now to FIG. 9 where a computer-implemented method 900 of enabling predictive decision-making is provided, a plurality of data including spatial, temporal and contextual elements can be received into predictive service core 150-N for a predetermined period of time at block 902. For example, a plurality of data including spatial, temporal and contextual elements that is previously identified as being a candidate for one or more rules of the first set of rules is received for a predetermined period of time as defined by a user via user interface 110 into forensics module 160. At block 905, the plurality of candidate data is stored, for example, in persistent storage such as a database associated with forensics module 160. At block 920, the plurality of candidate data can be retrieved. In some embodiments, the plurality of candidate data can be retrieved using a playback feature of forensics module 160. At block 910, a first set of rules is received. In various embodiments, a first set of rules can include rules associated with, and defined by, a user via user interface 110 and communicated to rules manager 120. In various embodiments, the first set of rules can be stored in a rules database of rules manager 120 associated with a user. At block 920, the plurality of candidate data is retrieved from the stored plurality of candidate data, for example in the database associated with forensics module 160. At block 940, spatial, temporal and/or contextual elements of the retrieved candidate data is indexed in memory (e.g. placed in a data structure in distributed working memory) as a function of the one or more rules. At block 950, the indexed data is analyzed to identify an event as satisfying one or more of the identified rule and determine whether one or more rules of the first set of rules (910) is satisfied. In various embodiments, rules manager 120, in communication with rules/decision engine module 130 and/or forensics module 160, can provide a rule suggestion (e.g. to modify an existing rule based on this stored plurality of data.) In various embodiments, the identified event can be indexed in memory by its spatial, temporal and/or contextual elements. In various embodiments, the identified event can be stored in persistent storage. In various embodiments, rules can be evaluated to determine whether they are satisfied using the indexed event.

Figure 8:
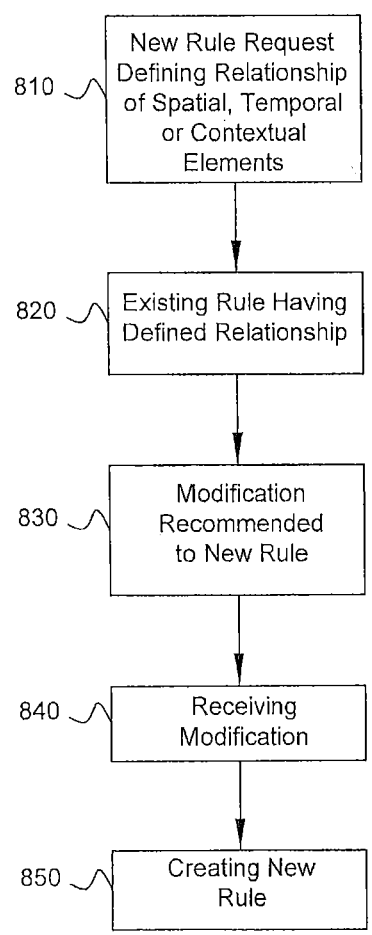
FIG. 8 is a flow chart illustrating a computer-implemented method of enabling predictive decision-making.

Referring now to FIG. 8, a computer-implemented method 800 of enabling predictive decision-making is provided. At block 810, a request for a new rule defining a relationship between spatial, temporal and contextual elements is received. For example, rules manager 120 can receive a request, such as a request provided via user interface 110 (e.g. FIG. 3C) to create a new rule having one or more definitions for various fields including spatial, temporal and contextual elements. At block 820, an existing rule having a defined relationship between spatial, temporal and contextual elements is identified. For example, rules manager 120 can identify an existing rule (e.g. from a rules database) having a defined relationship between spatial, temporal and contextual elements. At block 830, a modification to the new rule request is recommended based on the identified existing rule. For example, rules manager 120 can recommend a modification to the request (e.g. request provided via user interface 110 (e.g. FIG. 3C)) to create a new rule based on the existing rule (e.g. from a rules database) it identified that had a defined relationship between spatial, temporal, and contextual elements.

For example, a user can define a rule to manage for predicting when to carry his or her inhaler based on his travel plans and define fields such as within 10 miles of his projected itinerary (including hotel, office, locations of public transit routes in vicinity of his or her itinerary, etc.), air quality index of greater than 100, and time of day that he or she expects to be outside (e.g. between 7 a.m. and 9 a.m. and between 5 p.m. and 10 p.m.). Rules manager 120 can search a rules database associated with various users and identify one or more existing rules for one or more users that are similar (e.g. are directed to predicting when to carry an inhaler). Additionally, rules manager 120 can communicate with rules/decision engine module 130 and determine whether rules/decision engine module 130 has created one or more relationships between one or more respective spatial, temporal or contextual elements of data determined to be a candidate for one or more of those identified rules (e.g. between a similar location as the new projected itinerary and an air quality index amount of 80, between a location substantially similar to user's current location and air temperature changes of greater than 20 degrees in a five hour period, etc.) Rules manager 120, and/or rules/decision engine module 130 in communication with rules manager 120, can suggest a modification to the user's rule on predicting when to carry his or her inhaler based on one or more of these created relationships of these other rules to improve the user's rule or the user's definitions for fields of the rule. For example, rules/decision engine module 130 in communication with rules manager 120 can suggest adding the user's current location and air temperature changes of greater than 20 degrees in a five hour period as definitions for fields in the user's rule or can suggest lowering the user's defined air quality index amount from 100 to 80 based on the user's defined location for his or her projected itinerary.

Referring back to FIG. 8, at block 840, a modification to the new rule request can be received based on the recommendation. For example, a user may receive a modification to the new rule request (add current location, add air temperature changes of greater than 20 degrees in a five hour period, lower defined air quality index amount from 100 to 80, etc.) via user interface 110 based on the recommendation. In some embodiments, the user may request a modification to the new rule request to rules manager 120 via user interface 110 based on a recommendation received from rules manager 120. In other embodiments, rules manager 120 may automatically update the new rule request based on a recommendation from itself and/or rules/decision engine module 130. At block 850, a new rule is created based on the modified new rule request. In various embodiments, a new rule is created by rules manager 120 when a user provides a modified new rule request via user interface 110. In some embodiments, a new rule is created automatically by rules manager 120 when a modified new rule request is received from rules/decision engine module 130. In various embodiments, the new rule is stored. For example, the new rule can be stored in a rules database restricted to the user. In various embodiments, the new rule can be stored in a rules database in memory.

In various embodiments, the new rule can be stored in a rules database that is open to more system or human users than the respective user who initiated the new rule request. In various embodiments, the new rule includes one or more fields associated with spatial, temporal or contextual elements (e.g. FIG. 3C). In various embodiments, the modification includes one or more additional fields. For example, the modification includes one or more fields not defined or identified in the original new rule request (e.g. within 10 miles of current location, air temperature changes of greater than 20 degrees in a five hour period, etc.) In various embodiments, the new rule includes one or more fields and values associated with the one or more fields, and the modification includes a modified value associated with the one or more fields. For example, the new rule includes an air quality index field defined with a value of 100 and the modification includes a modified value of 80 associated with the air quality index field.

Figure 10:
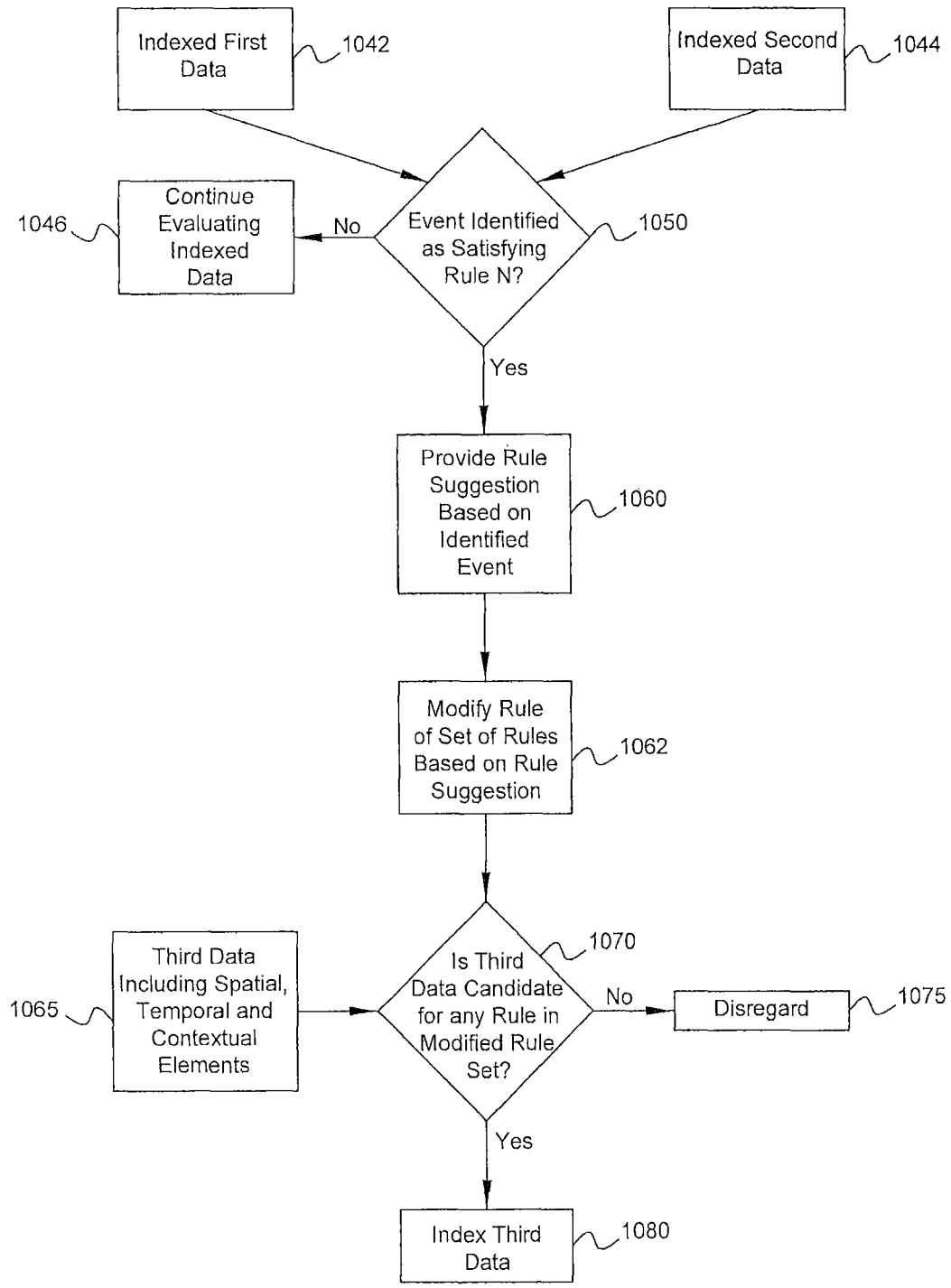
FIG. 10 is a flow chart illustrating a computer-implemented method of enabling predictive decision-making.

Referring now to FIG. 10, a computer-implemented method 1000 of enabling predictive decision-making is provided. At blocks 1042 and 1044, first received data and second received data determined to be a candidate for one or more rules of a first set of rules (e.g. 910) is indexed in memory by its respective spatial, temporal or contextual elements as a function of the one or more rules. At block 1050, where rule N is one of the rules for which the received first data and received second data is identified as being a candidate, the indexed first and second data elements are evaluated in memory to determine if rule N is satisfied (i.e. identify an event as satisfying rule N). For example, rules/decision engine module 130 can evaluate the indexed first and second data elements in memory to determine if the respective rule is satisfied. At block 1046, if no events are identified as satisfying rule N, the evaluation of indexed data continues. At block 1060, a rule suggestion is provided based on an identified event that satisfies one or more of the one or more rules (e.g. Rule N). For example, rules manager 120 can suggest a modification to one or more of the rules of the first set (e.g. Rule N) based on the identified event. In some embodiments, if rules/decision engine module 130 determines that a rule (e.g. rule N) is satisfied based on an identified event, rules/decision engine module 130 and communications interface module 170, can communicate a rule suggestion to the user (e.g. via user interface 110).

For example, one rule in a set of rules can include the defined rule for a user to predict when to carry his or her inhaler based on his travel plans and define fields such as within 10 miles of his projected itinerary (including hotel, office, locations of public transit routes in vicinity of his or her itinerary, etc.), air quality index of greater than 100, and time of day that he or she expects to be outside (e.g. between 7 a.m. and 9 a.m. and between 5 p.m. and 10 p.m.). Rules manager 120 can search a rules database associated with various users and identify one or more additional rules for one or more users that are similar (e.g. are directed to predicting when to carry an inhaler). Additionally, rules/decision engine module 130 can communicate with rules manager 120 when it determines that one or more of such rules are satisfied (e.g. in a similar location to the user's projected itinerary location) and can communicate spatial, temporal and contextual elements of data satisfying the rule and/or attributes of an event identified as satisfying the rule. Rules manager 120, and/or rules/decision engine module 130 in communication with rules manager 120, can suggest a modification to the user's rule on predicting when to carry his or her inhaler based on the identified event. For example, rules/decision engine module 130 in communication with rules manager 120 can suggest modifying the time of day fields defined in the rule based on the time of day of the identified event. In various embodiments, a user can provide an input via user interface 110 to rules manager 120 (e.g. by defining rule suggestion notification fields) that a rule is automatically modified based on rule suggestions made via rules/decision engine module 130 communicating with rules manager 120. In some embodiments, a user can manually select whether to accept, decline or modify a rule suggestion communicated to the user (e.g. via user interface 110) from rules manager 120.

At block 1062, one or more rules (e.g. Rule N) is modified based on the rule suggestion. In various embodiments, the modified one or more rules is stored in a rules database of rules manager 120 associated with the first set of rules for the user or a group of users such that the first set of rules is modified. At block 1070, the third data is evaluated, e.g. via rules/decision engine module 130, and each rule of the modified first set (including the modified Rule N) for which the received third data is determined to be a candidate is identified. At block 1075, if third received data is not determined to be a candidate for any rule of the modified first set of rules, it is disregarded. In various embodiments, spatial, temporal or contextual elements of the third received data that is identified as being a candidate for one or more rules of the modified first set is indexed in memory as a function of each identified rule for which the third received data is determined to be a candidate. At block 1080, if the third received data is determined to be a candidate for one or more rules of the modified first set, the third received data is indexed by its temporal, spatial and contextual elements as a function of the identified one or more rules.

Various embodiments of the present disclosure address the foregoing deficiencies of latency in collecting and processing information and providing results to users to facilitate real-time, predictive decision-making and predictive analytics in dynamic and high data volume environments. The inventors have developed systems and methods of intelligently distributing processing capabilities among a plurality of nodes in an ad hoc network that provide users with predictive decision-making and response capabilities to improve revenue, decrease costs, shorten detection to response cycle times, save lives, exploit and/or take advantage of opportunities, and permit individuals, businesses, government agencies, friends and families alike to proactively detect and predict potential problems or risks and provide tailored solutions before the onset of such problems or risks.

Figure 11A:
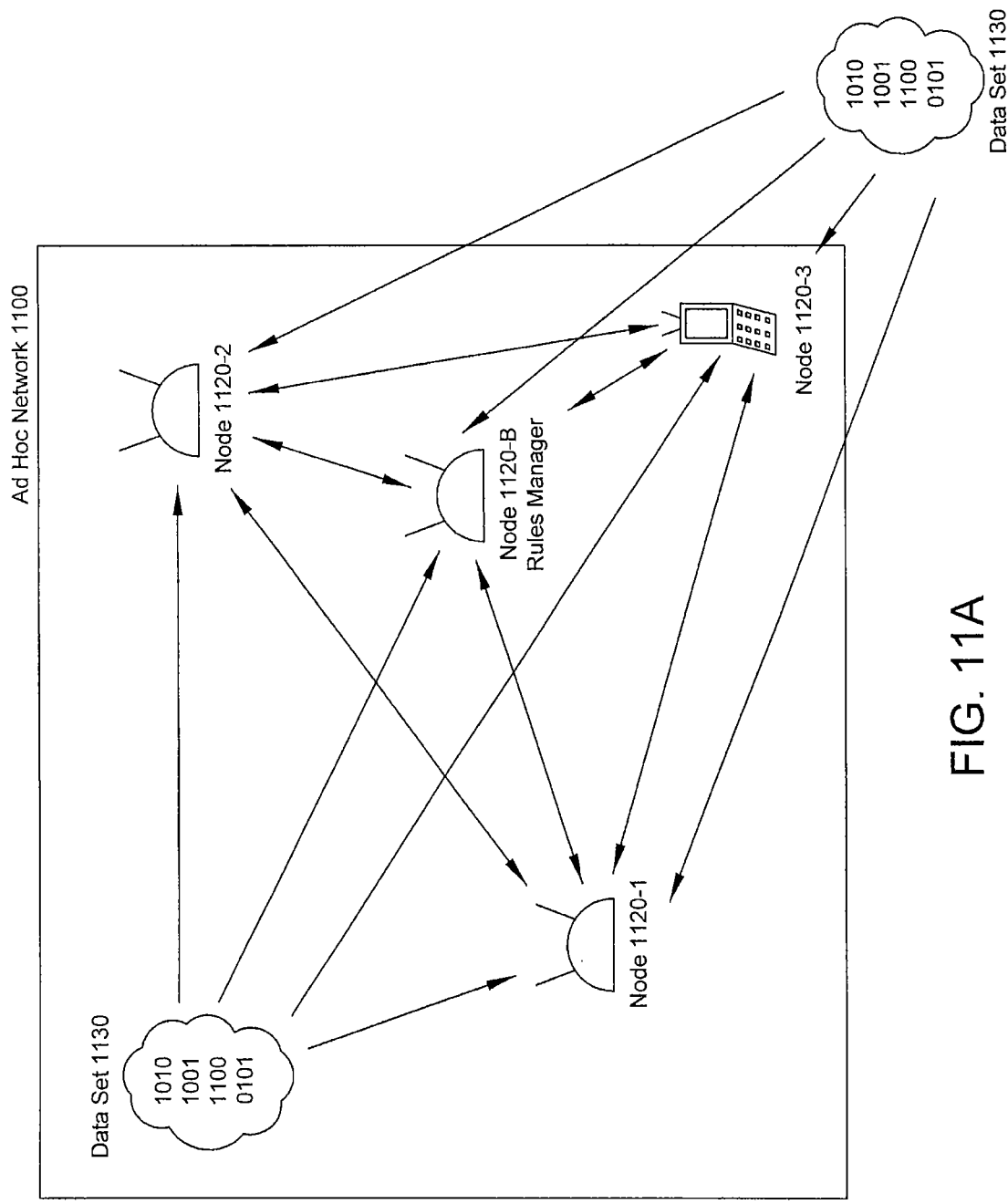
FIG. 11A is a block diagram of a system for predictive decision-making according to some embodiments.
Figure 11B:
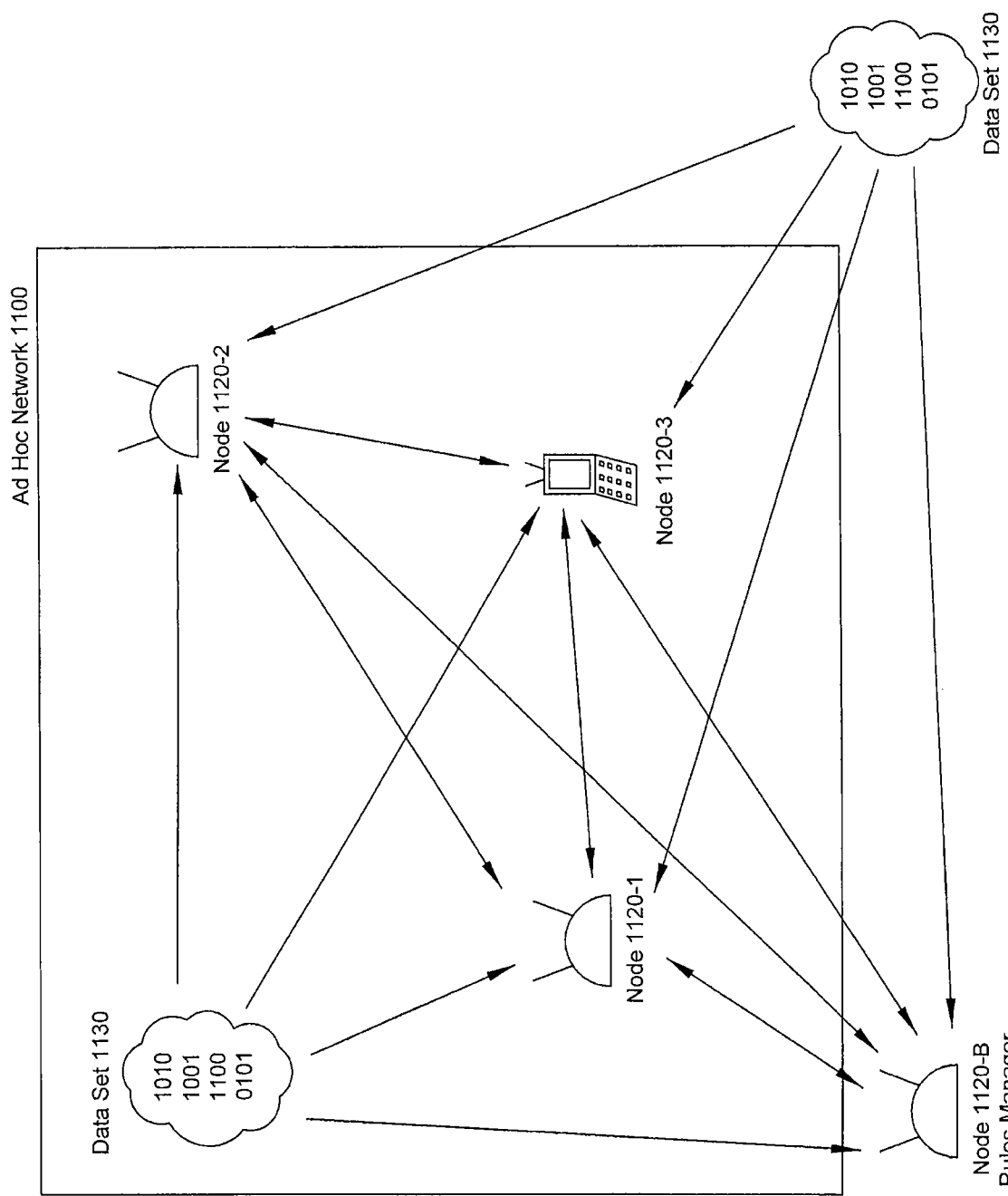
FIG. 11B is a block diagram of a system for predictive decision-making according to some embodiments.
Figure 11C:
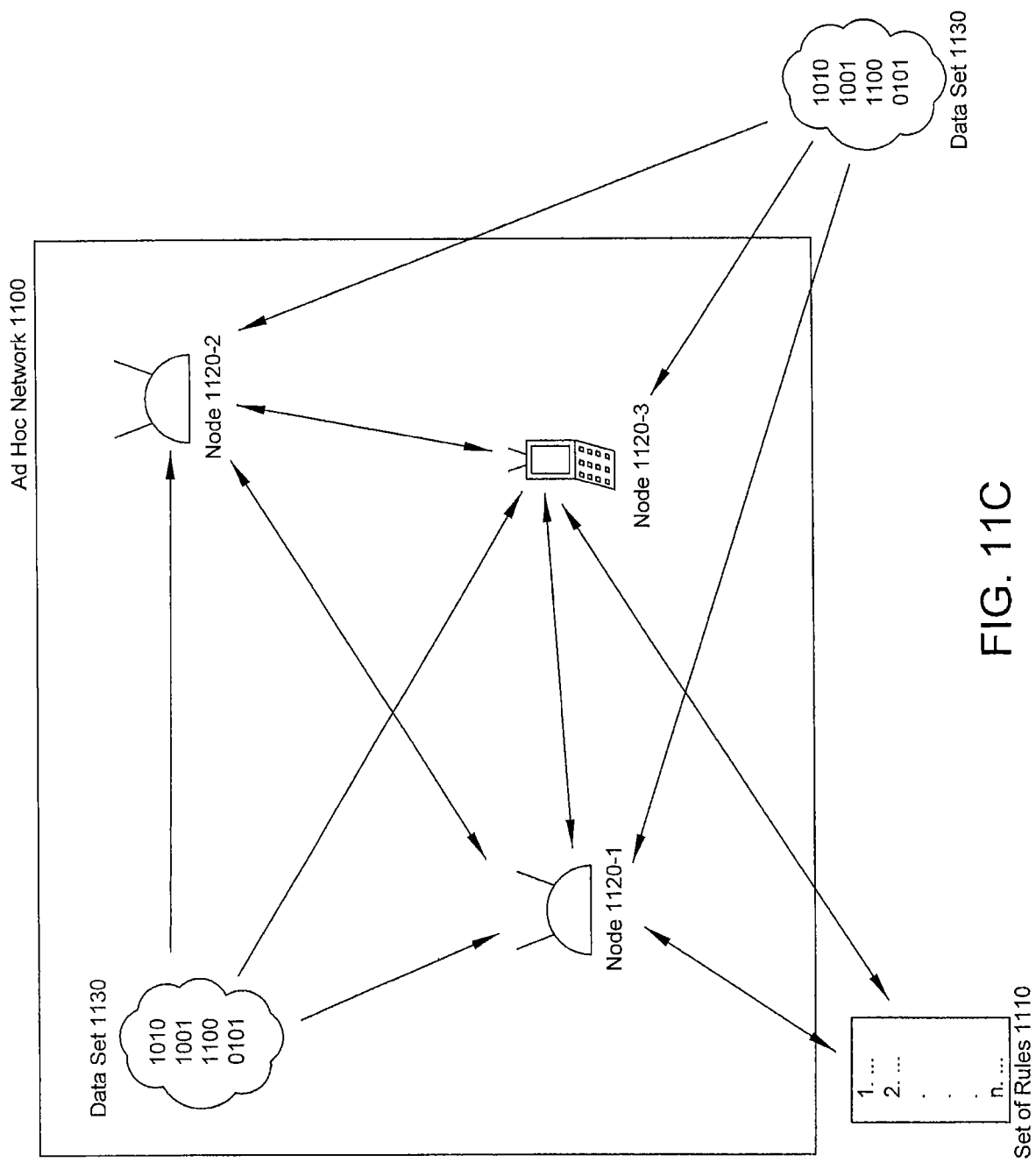
FIG. 11C is a block diagram of a system for predictive decision-making according to some embodiments.

Various embodiments of the present disclosure provide an ad hoc network 1100 as shown in FIGS. 11A-C that includes: a set of rules 1110; distributed nodes (1120-B, 1120-1, 1120-2, etc.), which may be referred to collectively as "distributed nodes 1120," each capable of processing the set of rules 1110; and, a data set 1130. The set of rules 1110 is operably connected with one or more of the distributed nodes 1120. One or more of the distributed nodes 1120 are operably connected with a set of rules 1110 and may receive data from a data set 1130 and/or another one of the one or more distributed nodes 1120. Each distributed node 1120 (1120-B, 1120-1, 1120-2, etc.) can be operably connected with one or more of the other distributed nodes 1120.

In some embodiments, the set of rules 1110 comprises one or more rules. In various embodiments, one or more rules of the set of rules 1110 is composed of a plurality of rule fields (e.g. subrules). In some embodiments, the rules of the set of rules 1110 are created manually (e.g. by a user, group of users, or administrator) via user interface 110 described above. In some embodiments, the rules manager 120 or rules/decision engine module 130 generates rules automatically. In some embodiments, the rule fields are defined by the user via the user interface 110. In some embodiments, the set of rules 1110 further comprises a plurality of sets of rules. In various embodiments, the set of rules 1110 includes an optimizing algorithm. In some embodiments, each rule of the set of rules 1110 contains a respective optimizing algorithm. In some embodiments, the set of rules 1110 can be one or more sets of rules residing on a base distributed node 1120-B/rules manager 120.

In some embodiments, a distributed node 1120 is a microprocessor-based computer terminal, mobile device, kiosk, cellular phone, smart phone, smart device, PDA, tablet, laptop or desktop computer. In some embodiments the distributed node 1120 is a smart refrigerator, smart thermostat, automobile, command and control system having a common operational picture (COP) or other situational awareness display, an automobile cockpit, a human-wearable computing device, locomotive, or any suitable node. In various embodiments, the distributed nodes 1120 are computer-processor equipped devices capable of operably connecting with one or more other computer-processor equipped devices. In some embodiments, user interface 110 can be found on one or more of the distributed nodes 1120. In some embodiments the user interface 110 can be accessed by one or more of the distributed nodes 1120. In some embodiments, the operable connections between distributed nodes 1120 may be wired connections such as Ethernet, coaxial, fiber optic, or any suitable wired standards and protocols. In some embodiments, the operable connections may be wireless such as WiFi, cellular, satellite, Bluetooth, microwave, other RF spectrum, IR, UV, optical, or any suitable wireless standards and protocols. In some embodiments, the distributed nodes are connected via the Internet, intranet, communications network, or a cloud-based system. In some embodiments one or more of the distributed nodes 1120 may be mobile by person or machine such as a drone, vehicle, plane, or ship. In some embodiments one or more of the distributed nodes 1120 may be fixed in its location. In some embodiments, the distributed nodes 1120 are added or removed from the ad hoc network 1100 based on a feature, characteristic, or operating condition of the distributed node 1120 such as the geographic location, operating status, access to data sets 1130, remaining energy capacity (such as battery life) and/or processing capabilities.

In some embodiments, a base distributed node 1120-B is the first distributed node 1120 to receive the set of rules 1110. The set of rules 1110 can be received from a source external or internal to the ad hoc network. In some embodiments, the set of rules 110 are generated on or by the base distributed node/rules manager 1120-B. In various embodiments, base distributed node/rules manager 1120-B is the node on which the rules initially reside. In some embodiments, the base distributed node 1120-B performs the same functions as the previously described rules manager 120. In some embodiments, the base distributed node 1120-B functions as the rules/decision engine module 130. As such, the terms base distributed node, rules manager, and rules/decision engine module can be used interchangeably. In some embodiments, such as shown in FIG. 11A, the base distributed node 1120-B distributes the set of rules 1110 or various rules of set of rules 1110 to other distributed nodes 1120 (e.g. 1120-1, 1120-2, 1120-3, . . . , 1120-N) according to the set of rules 1110. In this embodiment, the rules manager and its functions are located on a single distributed node 1120 within the ad hoc network 1100. In some embodiments, the set of rules 1110 is transferred from the base distributed node 1120-B to another distributed node 1120. The receiving distributed node 1120 can be designated as the base distributed node 1120-B and perform the function of distributing the rules of set of rules 1110 as well as the functions of the rules manager 120 and/or rules/decision engine module 130 according to the set of rules 1110. In various embodiments, the functions of base distributed node 1120-B are performed by a device outside of the ad hoc network 1100, as shown in FIG. 11B. In some embodiments, the base distributed node's 1120-B functions are distributed among more than one of the distributed nodes 1120 as shown in FIG. 11C.

In various embodiments, the data set 1130 consists of any suitable type of data identified as potentially satisfying in whole or in part the set of rules 1110 or one or more rules of the set of rules 1110. In some embodiments, the data set 1130 is a stream of data generated from within the ad hoc network 1110. In various embodiments, this data stream may be generated by one of the distributed nodes 1120. In some embodiments, this data stream is generated from a device separate from the distributed nodes 1120, such as a camera, radar system, wave-height buoy, etc. In some embodiments, the data set 1130 is a stream of data accessed by one or more distributed nodes 1120 from outside the ad hoc network 1100 (e.g. from a cloud computing environment or from the Internet). In some embodiments, a stream of data is provided by the streaming data module 140. In others, a streaming data source is the external streaming data 144 source. In some embodiments, the data set 1130 is a repository of static data maintained in the volatile or persistent memory of one or more distributed nodes 1120. In some embodiments, the static data is accessed by one or more distributed nodes 1120 from nodes and/or data sources within the ad hoc network 1100. In some embodiments, the static data is accessed from data sources outside the ad hoc network 1100 (e.g. from a cloud computing environment or from the Internet). In various embodiment, a static source is the static data module 135. In some embodiments, a static source is the external static data 134. In various embodiments, the data set 1130 further comprises a plurality of data sets.

Figure 12:
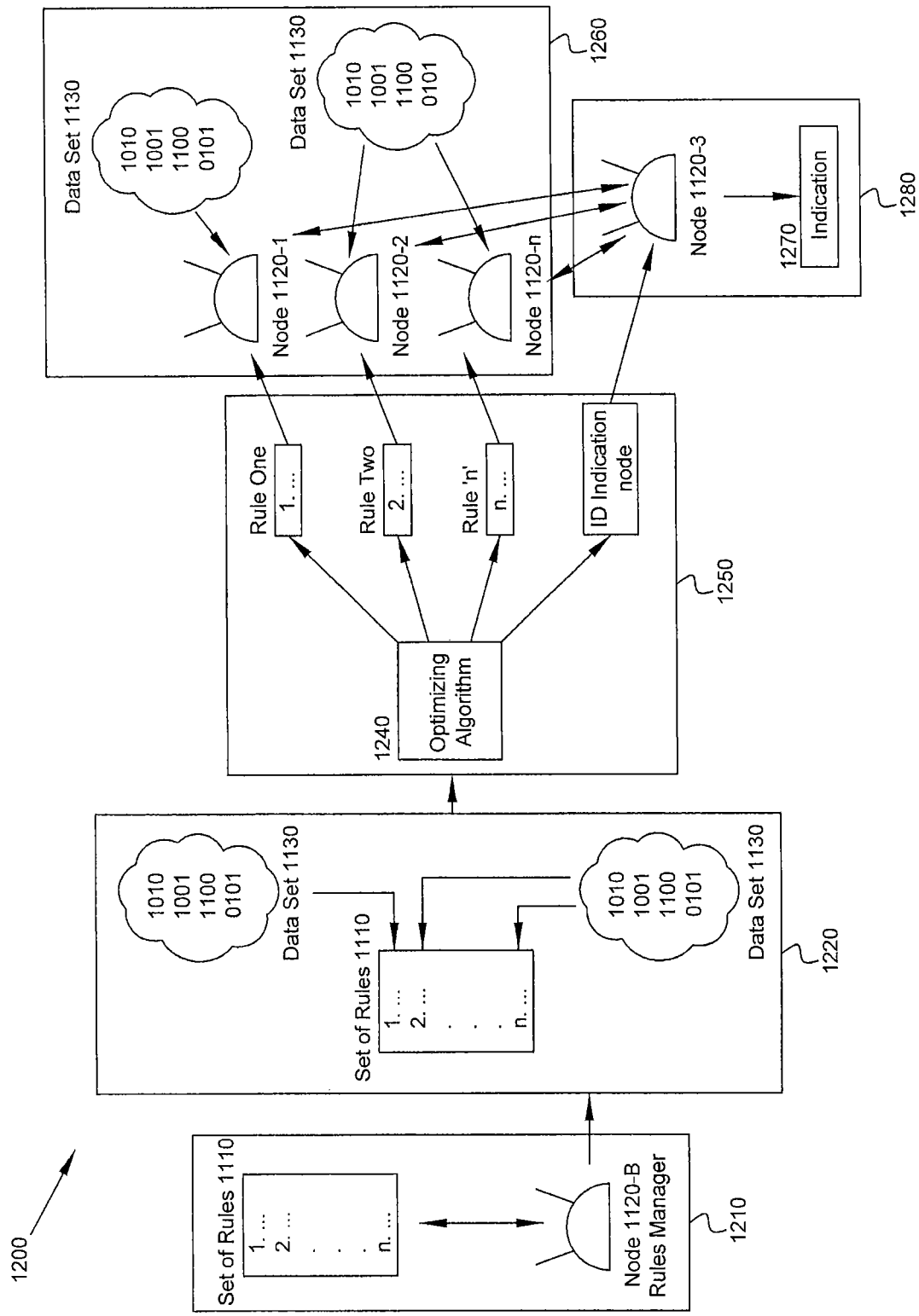
FIG. 12 is an example of a system operating to enable predictive decision-making according to some embodiments.

With reference now to FIG. 12, a computer-implemented system 1200 of enabling predicative decision-making is provided. At block 1210, a set of rules 1110 is received at a base distributed node/rules manager 1120-B. In some embodiments, the set of rules 1110 may be generated on or accessed by the base distributed node 1120-B. The base distributed node 1120-B can identify a data set 1130 for each received rule of set of rules 1110 at block 1220. In some embodiments, the identification of the data set 1130 will include the location, size, and format or data type in the data set 1130, or any suitable data identifier. In various embodiments, the step of identifying a source of data includes identifying one or more of a dynamic data source, a location of the data, or an origin of the data. At block 1250, the set of rules 1110 and the identified data set(s) 1130 from step 1220 are processed with an optimizing algorithm 1240. In some embodiments, this processing results in identifying and selecting a first (second, nth) distributed node 1120-1 (1120-2, 1120-N) and distributing one or more rules of the set of rules 1110 to the identified distributed node 1120-1 (1120-2, 1120-N). In various embodiments, the base distributed node 1120-B can distribute one or more portions (or subrules) of one or more rules of the set of rules 1110 to the distributed nodes 1120. In some embodiments, this processing can result in the identification of a third distributed node 1120-3 to provide an indication 1270. In some embodiments, a first distributed node 1120-1 is different from a second distributed node 1120-2 and a third distributed node 1120-3 is the same as the first or second distributed node 1120-1 or 1120-2 (not shown).

In block 1260, the first distributed node 1120-1 (1120-2, . . . , 1120-N) receives the first (second, nth) rule of set of rules 1110 as well as the data set 1130 required to satisfy the first rule. The first (second, . . . , nth) distributed node 1120-1 (1120-2, . . . , 1120-N) processes the data set 1130 as a function of the received first rule and provides the processed results to distributed node 1120-3. In some embodiments, the distributed nodes 1120 process the rules and data in volatile or persistent memory data structures as previously described. In block 1280, the distributed node 1120-3 produces an indication 1270 based on the received processed results according to one or more rules of the set of rules 1110.

In some embodiments, one or more rules of the set of rules 1110 includes the optimizing algorithm 1240. In various embodiments, the base distributed node/rules manager 1120-B includes the optimizing algorithm 1240. In some embodiments, one of the rules/subrules of the set of rules 1110 includes the optimizing algorithm 1240. In some embodiments, the optimizing algorithm 1240 contains instructions for selecting a first distributed node 1120-1 to process one or more rules, or a portion of one or more rules, of the set of rules 1110. In various embodiments, the optimizing algorithm contains instructions for selecting a plurality of distributed nodes 1120 to process one or more rules or portions of rules. In some embodiments, distributed nodes 1120 are aware of the set of rules 1110, types of data sets 1130 for which their processing is optimized, and the data set(s) 1130 to which they have access. For instance, a smart refrigerator may be capable of processing the set of rules 1100 while it also measures its internal temperature (a data set). In these embodiments, a distributed node 1120 (e.g. the smart refrigerator) may interface with the optimizing algorithm 1240 and self-select, or provide a suggestion that it be selected to process the set of rules 1110, or rules and subrules from the set of rules 1110, requiring this internal temperature data set. In some embodiments, the optimizing algorithm 1240 selects a distributed node 1120 in order to minimize the transferred amount of data. In some embodiments, the selection of a distributed node 1120 using the optimizing algorithm 1240 is made as a function of the availability of the distributed node 1120. In various embodiments, the optimizing algorithm 1240 selects the distributed node 1120 in order to minimize the energy expended, the power or time to process the rules and data sets, the total processing requirement, or the time until the indication 1270 occurs. In some embodiments the optimizing algorithm minimizes the processing required to process the received set of rules 1110. In some embodiments, the optimizing rule 1240 selects the distributed node 1120 to process a rule based on processing capabilities of the distributed node 1120 such as processor speed, power consumption, static and dynamic memory capacity, format or type, current location, origin, and size of the data. In various embodiments, the optimizing algorithm 1240 will select the indicating node (e.g. 1120-3 as shown in FIG. 12) based on the node's capabilities to provide the indication. For example, if a distributed node 1120 does not have a user interface, it would not be selected to provide an indication requiring a user input or response, such as an acknowledgment or selection of which course of action to take.

In some embodiments the indication 1270 results from receiving processed results from the first (second, . . . , nth) distributed nodes 1120-1 (1120-2, . . . , 1120-n) as a function of one or more, or a portion of one or more, rules of the set of rules 1110. In some embodiments, the indication 1270 includes displaying the received processed results at the third distributed node 1120-3. In various embodiments, the indication 1270 provides an alert from the third distributed node 1120-3. In some embodiments, the indication 1270 from the third distributed node 1120-3 will be a transmitted notification message. In some embodiments, this transmitted notification is an email or text message. In some embodiments, the indication 1270 will be a change in the display of the third distributed node 1120-3. In some embodiments, the indication 1270 will display a recommended action sequence at the third distributed node 1120-3. In various embodiments, the above indications provided at the third distributed node 1120-3 are displayed at other distributed nodes 1120. In some embodiments, the indication 1270 is a processed result sent to another distributed node 1120, or to a system (e.g. to a cloud computing environment or tp the Internet). In various embodiments, the provided indication is a rule suggestion as previously described in the present disclosure. Various embodiments can have multiple indications provided.

Figure 13:
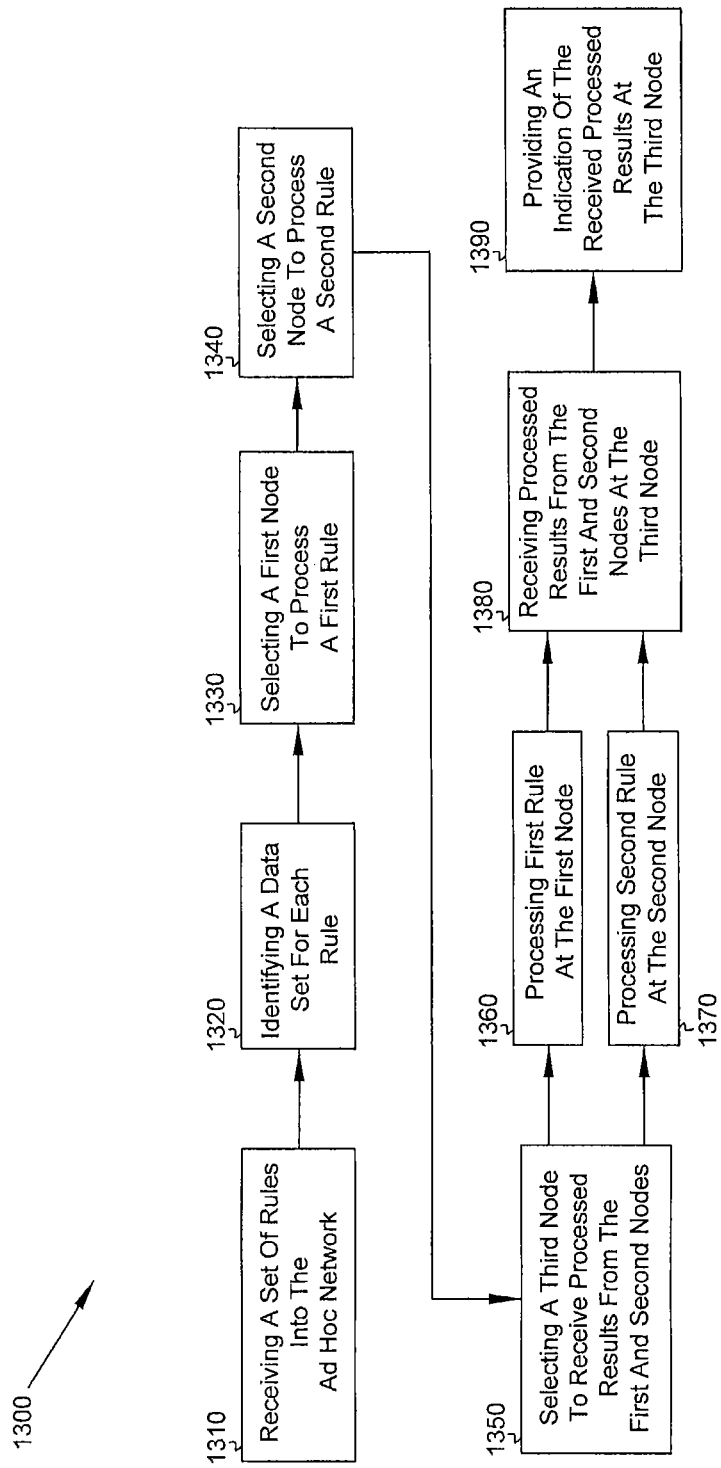
FIG. 13 is a flow chart illustrating a computer-implemented method for predictive decision-making according to some embodiments.

FIG. 13 is a computer-implemented method 1300 for predictive decision-making according to some embodiments. At block 1310, a set of rules is received into an ad hoc network of distributed nodes 1120. At block 1320, the base distributed node/rules manager 1120-B identifies one or more data sets 1130 which are potential candidates for satisfying one or more rules, or a portion of one or more rules, of the set of rules 1110. At block 1330 and 1340, the base distributed node 1120-B identifies a first distributed node 1120-1 and a second distributed node 1120-2 to process a first and second rule or portion of a rule, respectively, as a function of the identified data set(s) 1130 as previously described. The base distributed node 1120-B also selects a third distributed node 1120-3, at block 1350, to receive the processed results from the first and second distributed nodes. At block 1360, the first distributed node 1120-1 processes the first rule or rule portion as a function of the identified data set 1130. At block 1370, the second distributed node 1120-2 processes the second rule or rule portion as a function of the identified data set 1130. These processed results are received at the third distributed node 1120-3 in block 1380. At block 1390, the third distributed node 1120-3 provides an indication of the received processed results. In various embodiments, the first distributed node 1120-1 is different from the second distributed node 1120-2, and the third distributed node 1120-3 is the same as either the first or second distributed node 1120-1 and 1120-2. It will be understood that three nodes are mentioned above for illustrative purposes, and that the ad hoc network 1100 may comprise any number of distributed nodes 1120.

Figure 14:
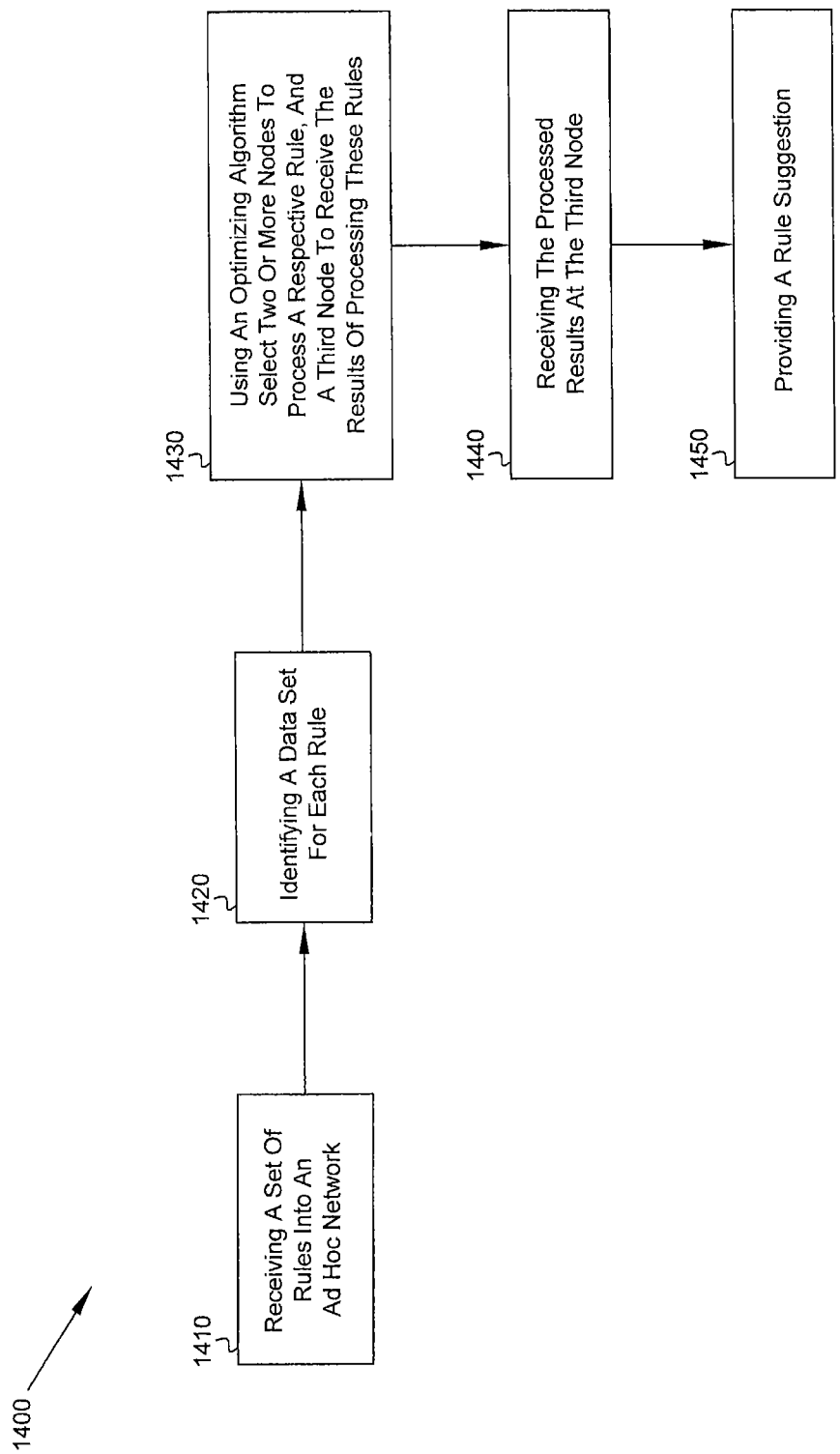
FIG. 14 is a flow chart illustrating a computer-implemented method for predictive decision-making according to some embodiments.

FIG. 14 is a computer-implemented method 1400 for prediction decision-making according to some embodiments. At block 1410, a set of rules 110 is received into an ad hoc network 1100 of distributed nodes 1120. At block 1420, the base distributed node/rules manager 1120-B identifies a data set 1130 for each rule from the set of rules 110. Using an optimizing algorithm 1240, the base distributed node 1120-B selects two or more distributed nodes 1120 to process a respective rule, and a third distributed node 1120 to receive the results of processing these rules at block 1430. At block 1440, the processed results are received at the third distributed node 1120. A rule suggestion is provided by the third distributed node 1120 based on the received processed results at block 1450.

As an illustrative example of the operation of a system for predictive decision making in an ad hoc network, a pharmaceutical company defines a set of rules directed toward temperature control of its refrigerators. In order to guard against losing temperature-sensitive products, the company can require a set of rules which provide indications of high refrigerator temperatures such that action can be taken before damage occurs. These rules may be generated by or for the company, or they may be defined by the selection or input of information into the rule fields by the company.

In this example, the high-temperature warning rule requires an indication to be sent to the facility manager and shift supervisor when a defined, pre-critical internal refrigerator temperature is reached. Once defined, the company's set of rules are transmitted from the service provider's rules manager to a distributed node within the ad hoc network such as a laptop. The laptop, being the first distributed node to receive the set of rules, becomes the base distributed node and functions as the rules manager or rules/decision engine module. The rules may also be generated locally on the rules manager, which can be the same laptop. As a base distributed node, the laptop can function as the distribution point for rules and portions of rules which are processed at other distributed nodes. This function can also be distributed to one or more other nodes within the ad hoc network. While the laptop is initially designated as the base distributed node, the laptop can designate another node as the base distributed node as needed.

Upon receiving the set of rules, the base operating node/laptop identifies the data sets required to satisfy the high temperature warning indication rule. The data sets can include, for example, at least refrigerator temperatures, but may also include additional data sets in order to provide more timely or different types of indications. The high temperature warning indication rule can be easily defined to provide different types of indications based on a variety of real-time parameters, such as the location of the person to whom the indication will be sent. For instance, while the shift supervisor's location will be consistent during her shift, the facility manager may have a generally set location only during the day. If the manager is at work, the indication can be an email or instant message sent to his work computer and/or mobile device; if at home, the indication could instead be emailed to his home computer, or a text message or a call can be placed to any desired line. In order to provide the correct type of real-time indication, a data set of the facility manager's location must be provided and processed by the ad hoc network.

This required location data set can be accessed by a variety of distributed nodes in the ad hoc network. Such data sets may come from network access points in the facility to which the facility manager's mobile device is connected, the mobile device directly as geo-location data is sent back to the network, his/her work computer if the manager is logged in based on his activity status, company servers when the facility manager logs in remotely, or any suitable data set source. The source of the location data set, if capable of processing the rules, can even be designated as a distributed node which provides results rather than merely placing data into the network, thereby minimizing the amount of transferred data. Rather than sending geo-location data back to a distributed node in the ad hoc network for processing, the manager's mobile device may be designated to process this location data, sending a processed result directing where the indication should be sent. For instance, the manager's mobile device may provide a result to the indication node that the indication should be emailed to his personal account when at home, rather than constantly sending geo-location data back to be processed by another node in the ad hoc network. The same end result is reached for this rule or subrule, with less data transferred.

The base distributed node/laptop can also identify which nodes are in the ad hoc network. The laptop may be in communication with, for example, multiple smart refrigerators or the mobile devices of the facility manager, shift supervisor, or other employees. Other nodes could be the facility's smart thermostat or other desktop or laptop computers. These nodes form an ad hoc network as nodes are allowed to enter and leave the network. For instance, during the day the facility manager may work in the facility, and his mobile device is connected to the ad hoc network and may be designated to process the refrigerator temperature data set. At night the manager leaves and his phone may no longer directly receive the data set required to process this rule. In such an instance, the base distributed node/laptop would recognize the manager's mobile device as no longer in receipt of the data and designate another available node to process the data sets and rules previously processed by the manager's mobile device. Selecting another device may be preferable to using bandwidth and intermediary paths and equipment to send the data to the manager's mobile device. Another example of a node can be a worker's desktop computer on and available during her shift, but off when she is not working. A node could also leave upon a sudden, unexpected loss of power. When a distributed node enters or leaves the ad hoc network, the functions performed by this node shifts as required.

Each of these distributed nodes in the ad hoc network can be evaluated by the base distributed node/laptop and the optimizing algorithm. This evaluation can determine which nodes are available to process the rules, which nodes are capable of processing the rule, which nodes can provide the indication, and other possible definable node characteristics. In various embodiments, the evaluation of each node's capabilities and availability is paired with the rules of the set of rules, data sets required to satisfy the rule, and the optimizing algorithm to determine which node is best suited to processes each rule or portion of a rule.

The optimizing algorithm may be defined to minimize the processing required to process the rules, minimize the amount of data transferred, select nodes based on availability to processes the rule and reach an indication as soon as possible, and may receive inputs from each node as to which rule and types of rules it should process. For instance, a smart refrigerator may stream a data set of its internal temperature to other devices for processing. If capable of processing the rule itself, however, the smart refrigerator may better function as a distributed node providing processed results of its internal temperature results rather than merely streaming data. Having the smart refrigerator process this portion of the rule would minimize the amount of data transferred as the refrigerator would no longer be required to continually stream temperature data to another distributed node. Rather, the smart refrigerator only transfers a fraction of its data stream—the processed result when the candidate data (the defined temperature) is reached. As such, the base distributed node/laptop may designate the smart refrigerator to run this portion of the high-temperature warning rule.

While the smart refrigerator may be capable of processing the high-temperature warning rule, it may not have the functionality to provide a phone call, email, text, or other indication to the facility manager and shift supervisor when a high temperature condition exists. As such, another node is designated to receive the processed results from the first distributed node (e.g. the high temperature condition of a smart refrigerator). One such node may be the shift supervisor's mobile device. Here the supervisor's mobile device receives the processed results from the smart refrigerator and can provide indication directly on this mobile device. The supervisor's mobile device can also send an email, text, and have a call placed to reach the facility manager as required by the rules. This will require the facility manager's location data set to be sent to the supervisor's mobile device for processing. Alternatively, the manager's mobile device may provide processed results of its location as previously described.

In another example of the operation of a system for predictive decision making, a law enforcement agency may be interested in monitoring potential drug drops from an aircraft to a vessel. The ad hoc network to support this monitoring may involve an interdicting law enforcement aircraft, an aerial surveillance radar, and a coast guard ship. In this scenario, it is suspected that drug drops tend to happen in a given geographic area of interest from recreational aircraft flying below 10,000 feet only when certain types of commercial ships are in the area of interest. A set of rules can be created to monitor for each component of the scenario to be processed separately at individual distributed nodes in the ad hoc network. Ideally, each distributed node processes the streams of data to which it has direct access and forwards only processed results when candidate data is found.

For instance, the aerial surveillance radar can detect the flight path of aircraft to determine an aircraft's geographic location and altitude. The radar may also have access to flight records to determine if the target aircraft is a recreational type. The aerial surveillance radar may be a ground based radar, a high altitude balloon, an aircraft, a ship, or other asset depending on the area of interest and each asset's location relative to this area. When an aircraft is operating below 10,000 feet in the geographic area of interest, the candidate data satisfying the rule is pulled from the radar data stream and processed. This processing can results in placing the candidate data and event into volatile or fixed memory as previously described in the present disclosure. If flight records for an aircraft indicates it is of a recreational type, this data may be pulled from the flight record data set and also processed. When all aircraft criteria (e.g. location, altitude, and type of aircraft) are met, the aerial surveillance radar distributed node transmits processed results to the indication node. In this case, the surveillance radar sends the location and characteristic data of the potential drug-shipping aircraft to the interdicting law enforcement aircraft.

The received processed results from the surveillance radar do not, however, meet all defined criteria for a potential drug drop, and will not necessarily prompt an indication at the interdicting law enforcement aircraft. Specifically, the presence of certain types of commercial ships has not yet been identified. This information may be provided by or to another node in the ad hoc network (e.g. a coast guard ship monitoring all AIS information from commercial ships in the targeted geographic location). When candidate data is received of the type of commercial ship of interest in the area of interest, processed results for this ship is pulled from the stream of AIS data and sent to the interdiction aircraft. It is at this point that the interdiction aircraft, receiving the first and second processed results from the aerial surveillance radar and the coast guard ship, processes these results and provides an indication. This indication may be a notification display in the interdiction aircraft of a potential drug drop location with the specific aircraft and ship information. The indication could be to automatically send a surveillance drone to monitor the specific location.

By distributing the processing of rules and portions of rules to distributed nodes in the ad hoc network, the bandwidth required to identify events is reduced as only candidate data and processed results are transmitted between distributed nodes. Noise from non-candidate data is filtered at its source rather than flooding each node with inconsequential data. For example, the aerial surveillance radar above does not provide all of the radar coverage and flight record data to the interdiction aircraft, nor does the coast guard ship transmit all AIS data. Rather, only candidate data is processed and transmitted. By reducing the amount of data flow, and eliminating unneeded data, it is possible to obtain a clearer tactical picture faster with fewer resources.

In some embodiments, one or more steps of the method can be implemented by one or more general purpose computers programmed in accordance with the principals discussed herein. In various embodiments, the general computer processor programmed in accordance with the principles described herein is provided in the cloud of a cloud computing environment. In some embodiments, the general computer processor programmed in accordance with the principles described herein is provided at one or more processing servers 252 of predictive service core 150-N and/or at an administrator of the cloud-based services 108. In various embodiments, the one or more general computer processors programmed in accordance with the principles described herein is provided in distributed nodes of an ad hoc networking environment. In some embodiments, the one or more general computer processors programmed in accordance with the principles described herein is provided at one or more processing servers of distributed nodes 1120-1 (1120-2, . . . , 1120-N) of an ad hoc networking environment. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that certain of the described program components and systems can generally be integrated together in a single software product being executed in the cloud, or packaged into multiple software products for execution in the cloud.

One or more steps of the processes and logic flows described in this specification can be performed by one or more programmable processors executing one or more computer programs to perform functions by operating on input data and generating output. One or more steps of the processes and logic flows can also be performed by, and apparatus can also be implemented as, special purpose logic circuitry, e.g., an FPGA (field programmable gate array) or an ASIC (application specific integrated circuit).

Various embodiments can be implemented in a cloud computing system that includes, and/or an ad hoc network that is in communication with, a back end component, e.g., as a data server, or that includes a middleware component, e.g., an application server, or that includes a front end component, e.g., a computer having a GUI or a Web browser through which an operator can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

While various embodiments have been described, it is to be understood that the embodiments described are illustrative only and that the scope of the subject matter is to be accorded a full range of equivalents, many variations and modifications naturally occurring to those of skill in the art from a perusal hereof.

What we claim is:

1. A computer-implemented method for predictive decision-making, comprising:
    receiving a set of rules into an ad-hoc network having distributed nodes, wherein each distributed node is capable of processing spatial, temporal, or contextual data elements as a function of one or more rules in the set of rules;
    for each rule of the received set of rules, identifying a respective potential candidate data set including spatial, temporal, and contextual data elements that are a respective potential candidate for the respective rule;
    selecting at least two nodes from the distributed nodes as a function of the respective identified potential candidate data set for each rule of the received set of rules;
    identifying, using at least one of the selected nodes, candidate spatial, temporal, and contextual data elements received by the respective selected node for at least one rule of the received set of rules;
    spatially, temporally, or contextually indexing, using at least one of the selected nodes, the respective identified candidate data elements for the at least one rule in memory as a function of the received set of rules; and
    changing a display of at least one of the plurality of distributed nodes based on the indexed candidate data elements.

2. The method of claim 1, wherein the at least one selected node performing the step of identifying candidate spatial, temporal, and contextual data elements is different from the at least one selected node performing the step of spatially, temporally, or contextually indexing the respective identified candidate data elements.

3. The method of claim 1, wherein the at least one selected node performing the step of spatially, temporally, or contextually indexing the respective identified candidate data elements is the same as the at least one of the plurality of distributed nodes comprising the display that is changed based on the indexed candidate data elements.

4. The method of claim 1, wherein different nodes of the at least two nodes are selected to perform the step of identifying candidate spatial, temporal, and contextual data elements for different rules of the received set of rules.

5. The method of claim 1, wherein different nodes of the at least two nodes are selected to perform the step of spatially, temporally, or contextually indexing for different rules of the received set of rules.

6. The method of claim 1, further comprising identifying an event as satisfying the at least one rule using the indexed candidate data elements.

7. The method of claim 6, wherein the step of changing the display comprises displaying an indication that the at least one rule is satisfied.

8. The method of claim 1, wherein the step of changing the display comprises one or more of the following steps:
    displaying the indexed candidate data elements;
    providing an alert from the at least one selected node performing the step of spatially, temporally, or contextually indexing the respective identified candidate data elements;
    providing an alert to the at least one of the plurality of distributed nodes comprising the display; and
    displaying a recommended action sequence at the at least one of the plurality of distributed nodes comprising the display based on the indexed candidate data elements.

9. The method of claim 1, further comprising disregarding, using at least one of the selected nodes, non-candidate data elements received by the respective selected node for the at least one rule of the received set of rules.

10. The method of claim 1, further comprising, at the at least one selected node:
performing the step of spatially, temporally, or contextually indexing the respective identified candidate data elements;
associating an uncertainty value with at least one of the indexed candidate data elements; and
modifying the uncertainty value based on other spatially, temporally, or contextually indexed data elements.

11. The method of claim 1, wherein the step of selecting the at least two nodes further comprises using an optimizing algorithm to minimize the amount of data elements transferred between the distributed nodes or to minimize the processing required by the distributed nodes to process data elements as a function of the received set of rules.

12. A system for predictive decision-making, comprising:
a set of rules;
a plurality of distributed nodes forming an ad hoc network, each of the plurality of nodes being capable of processing spatial, temporal, or contextual data elements as a function of one or more rules in the set of rules;
a rules manager configured to, for each rule of the set of rules, identify a respective potential candidate data set including spatial, temporal, and contextual data elements that are a respective potential candidate for the respective rule, and further configured to select at least two distributed nodes of the plurality of distributed nodes as a function of the respective identified potential candidate data set for each rule of the set of rules;
wherein at least one of the selected distributed nodes is configured to identify candidate spatial, temporal, and contextual data elements received by the at least one selected node for at least one rule of the set of rules; and
wherein at least one of the selected distributed nodes comprises spatial, temporal, and contextual in memory distributed data structures and is configured to place respective identified spatial, temporal, or contextual candidate data elements in the corresponding one of the spatial, temporal, and contextual in memory distributed data structures as a function of the at least one rule of the set of rules.

13. The system of claim 12, wherein the at least one selected node configured to identify candidate spatial, temporal, and contextual data elements is different from the at least one selected node configured to place respective identified spatial, temporal, or contextual candidate data elements in the corresponding one of the spatial, temporal, and contextual in memory distributed data structures.

14. The system of claim 12, wherein the rules manager is in a distributed node of the plurality of distributed nodes.

15. The system of claim 12, wherein the rules manager is distributed between two or more distributed nodes of the plurality of distributed nodes.

16. The system of claim 12, further comprising at least one distributed node of the plurality of distributed nodes comprising at least one of a display configured to change based on the indexed candidate data elements, or an interface configured to provide an alert or notification message to another distributed node of the plurality of distributed nodes based on the indexed candidate data elements.

17. The system of claim 12, wherein the at least one selected node configured to identify candidate spatial, temporal, and contextual data elements is further configured to disregard received non-candidate data elements for the at least one rule of the set of rules.

18. A computer-implemented method for predictive decision-making, comprising:
receiving a set of rules into an ad-hoc network having a plurality of distributed nodes, wherein each distributed node is capable of processing spatial, temporal, or contextual data elements as a function of one or more rules in the received set of rules;
for each rule of the received set of rules, identifying a respective potential candidate data set including spatial, temporal, and contextual data elements that are a respective potential candidate for the respective rule;
selecting at least two distributed nodes from the plurality of distributed nodes as a function of a respective identified potential candidate data set for each rule of the received set of rules;
identifying, using at least one of the selected nodes, candidate spatial, temporal, and contextual data elements received by the respective selected node for at least one rule of the received set of rules;
spatially, temporally, or contextually indexing, using at least one of the selected nodes, the respective identified candidate data elements for the at least one rule in memory as a function of the received set of rules; and
creating a relationship between at least two of the indexed candidate spatial, temporal or contextual data elements in a memory of at least one node of the plurality of distributed nodes.

19. The method of claim 18, further comprising providing a rule suggestion based on the created relationship.

20. The method of claim 19, wherein the rule suggestion comprises a modification of one or more rules in the set of rules or an addition of a new rule to the set of rules.

* * * * *